(12) United States Patent
Huang et al.

(10) Patent No.: US 12,448,214 B2
(45) Date of Patent: Oct. 21, 2025

(54) ADJUSTABLE CHUTE STRUCTURES

(71) Applicant: GUANGZHOU JINGLIANGYI HARDWARE PRODUCTS CO., LTD., Guangdong (CN)

(72) Inventors: Zicheng Huang, Guangzhou (CN); Yiwen Zhang, Guangzhou (CN)

(73) Assignee: GUANGZHOU JINGLIANGYI HARDWARE PRODUCTS CO., LTD., Guangzhou (CN)

( * ) Notice: Subject to any disclaimer, the term of this patent is extended or adjusted under 35 U.S.C. 154(b) by 0 days.

(21) Appl. No.: 19/183,916

(22) Filed: Apr. 20, 2025

(65) Prior Publication Data
US 2025/0250116 A1    Aug. 7, 2025

Related U.S. Application Data

(63) Continuation of application No. PCT/CN2024/072558, filed on Jan. 16, 2024.

(30) Foreign Application Priority Data

Jun. 20, 2023 (CN) .......................... 202321596673.9
Aug. 21, 2023 (CN) .......................... 202322248227.5

(51) Int. Cl.
*B65G 11/18*    (2006.01)
*A47F 3/00*     (2006.01)
*B65G 13/12*    (2006.01)

(52) U.S. Cl.
CPC .................................... *B65G 11/18* (2013.01)

(58) Field of Classification Search
CPC ............ B65G 11/18; B65G 13/12; A47F 3/00
(Continued)

(56) References Cited

U.S. PATENT DOCUMENTS 5,474,412 A  * 12/1995  Pfeiffer ................. B65G 1/023
                                                211/187
RE38,517 E  *  5/2004  Pfeiffer ................. B65G 1/023
                                                211/151
(Continued)

FOREIGN PATENT DOCUMENTS

CN    217610302 U    10/2022
CN    217610341 U    10/2022
(Continued)

OTHER PUBLICATIONS

International Search Report in PCT/CN2024/072558 mailed on Apr. 19, 2024, 7 pages.
(Continued)

*Primary Examiner* — Douglas A Hess
(74) *Attorney, Agent, or Firm* — PORUS IP LLC

(57) ABSTRACT

An adjustable chute structure is provided, which includes at least one chute and two cross beams disposed at two ends of the chute. Each end of the chute is connected with a chute plug, which is slidably mounted on the cross beams and is provided with a receiving groove. The receiving groove is provided with a movable switch, and a first mating member and a second mating member coupled with the movable switch. The cross beams are provided with a plurality of first limiting members arranged consecutively in a lengthwise direction, and the chute engages or plug-fits with the first limiting member through the first mating member to be fixed transversely between the cross beams. Each cross beam is provided with a second limiting member, and the chute is interlocked and connected with the second limiting member through the second mating member to be fixed longitudinally to the cross beams.

10 Claims, 23 Drawing Sheets

(58) Field of Classification Search
USPC .......................................................... 193/2 R
See application file for complete search history.

(56) References Cited

U.S. PATENT DOCUMENTS

| | | | |
|---|---|---|---|
| 9,532,658 B2* | 1/2017 | Hardy | ........................ A47F 3/02 |
| 10,617,206 B2* | 4/2020 | Brügmann | ............ A47B 57/588 |
| 11,259,652 B2* | 3/2022 | Hardy | ........................ A47F 1/12 |
| 11,583,109 B2* | 2/2023 | Hardy | ................... A47F 5/0068 |
| 2004/0011752 A1 | 1/2004 | Zadak | |

FOREIGN PATENT DOCUMENTS

| CN | 218246546 U | 1/2023 |
|---|---|---|
| CN | 219125843 U | 6/2023 |
| CN | 220010929 U | 11/2023 |

OTHER PUBLICATIONS

Written Opinion in PCT/CN2024/072558 mailed on Apr. 19, 2024, 7 pages.

* cited by examiner

ADJUSTABLE CHUTE STRUCTURES

CROSS-REFERENCE TO RELATED APPLICATIONS

This application is a Continuation of International Application No. PCT/CN2024/072558, filed on Jan. 16, 2024, which claimed priority to the Chinese Application No. 202321596673.9, filed on Jun. 20, 2023, and Chinese Application No. 202322248227.5, filed on Aug. 21, 2023, the entire contents of each of which are hereby incorporated by reference.

TECHNICAL FIELD

The present disclosure relates to the technical field of chutes, and in particular, to adjustable chute structures.

BACKGROUND

Shelf chutes are usually adjusted for spacing through a snap-fit structure, i.e., the engagement of the snap fastener of the chute plug in an up-and-down direction is used to realize the longitudinal fixing of the chutes. The snap fastener of the chute plug extends beyond a rail of a cross beam, which increases the surface contact friction between the chute and the cross beam, thereby controlling the transverse tension of the chutes and facilitating the spacing adjustment between two chutes.

However, this up-and-down snap-fit, where the tightness is adjusted by the friction-over-earnings fit of the rail of the cross beam and the snap fastener of the chute plug, will have the following disadvantages.

First, the friction contact surface of the rail and the chute plug of the snap fastener is too small. Adjusting the tightness simply relies on the contact surface of the interference friction cannot reach an ideal state of locking the chute. When subjected to significant transverse force, the chute undergoes slow transverse movement, which cannot be completely locked in the original position, resulting in the spacing between two chutes not being fixed, thus affecting the stability and quality of the entire chute product.

First, when the snap fastener is engaged in the up-and-down direction, the rail and the snap fastener of the chute plug will be subject to longitudinal friction. During the slow transverse movement of the chute, the rail and the snap fastener of the chute plug will be subject to longitudinal friction. After prolonged use, the contact area between the rail and the snap fastener of the chute plug will decrease due to the constant friction between them, resulting in an excessively large gap between the two, making it difficult to snap together tightly. This results in a loose connection between the chute and the cross beam, which further reduces the stability of the entire chute product and affects its service life.

Therefore, it is desirable to provide an adjustable chute structure that improves the stability of the entire chute product and prolongs the service life of the chute structure while realizing the chute function.

SUMMARY

According to some embodiments of the present disclosure, an adjustable chute structure is provided. The adjustable chute structure may include at least one chute and two cross beams disposed at two ends of the chute. Each of the two ends of the chute may be connected with a chute plug, and the chute plug may be slidably mounted on the two cross beams. The chute plug may be provided with a receiving groove, the receiving groove may be provided with a movable switch, and a first mating member and a second mating member coupled with the movable switch. The two cross beams may be provided with a plurality of first limiting members arranged consecutively in a lengthwise direction, and the chute may engage or plug-fit with the first limiting member through the first mating member, to fix the chute between the two cross beams in a transverse direction. Each of the two cross beams may be provided with a second limiting member, and the chute is interlocked and connected with the second limiting member through the second mating member, to fix the chute to the two cross beams in a longitudinal direction.

In some embodiments, the first limiting member may be a rack secured to the two cross beams, the rack may be provided with consecutive first catches, the first mating member may be a catch tooth, and the first catches may engage with the catch tooth.

In some embodiments, the second limiting member is a slot provided on a top surface of each of the two cross beams, the second mating member is a catch member, and the catch member is interlocked with the slot.

In some embodiments, the catch tooth and the catch member may both be fixedly provided on a bottom surface of the movable switch to cause the movable switch to move the catch tooth and the catch member.

In some embodiments, the adjustable chute structure may further include a connecting member configured to connect the catch tooth and the catch member. The connecting member may be disposed below the movable switch, the connecting member may be provided with a sloping groove, a bottom surface of the movable switch may be provided with a limiting protrusion adapted to the sloping groove, the limiting protrusion may be provided in the sloping groove to enable the movable switch to control movement of the connecting member to drive the catch tooth and the catch member to move.

In some embodiments, the bottom surface of the movable switch may be provided with a plurality of snaps, the receiving groove may be provided with a plurality of snap slots, and the plurality of snaps may be snap-fit mounted in the plurality of snap slots to enable the movable switch to be slidably provided in the receiving groove.

In some embodiments, a side of the movable switch may be provided with a horizontal swivel, and two ends of the horizontal swivel may be hinged in the receiving groove to enable the movable switch to rotate about the horizontal swivel as an axis.

In some embodiments, the receiving groove may be provided with a limiting block, the movable switch may be provided with a sliding groove, and the limiting block may be slidably connected in the sliding groove to enable the movable switch to be slidably provided in the receiving groove.

In some embodiments, a spring may be provided in the receiving groove, a stopper may be provided on the top surface of the movable switch, and two ends of the spring may rest against the stopper and the limiting block, respectively; or a spring may be provided in the sliding groove, with two ends of the spring rest against the limiting block and a groove wall of the sliding groove, respectively.

In some embodiments, the two cross beams may be fixedly provided with a long strip, the first limiting member may include a plurality of circular holes set in the long strip, the first mating member may be a circular rod, and the circular rod may be inserted and coordinated with the plurality of circular holes. The second limiting member may include two limiting slots provided on two sides of the long strip, the second mating member may include two L-shaped members provided on two sides of the circular rod, and horizontal segments of the two L-shaped members may be respectively interlocked and connected with the two limiting slots. The circular rod and the two L-shaped members may be fixedly provided on the bottom surface of the movable switch, and the circular rod and the two L-shaped members may be driven to rotate when the movable switch rotates.

BRIEF DESCRIPTION OF THE DRAWINGS

The present disclosure is further illustrated in terms of exemplary embodiments. These exemplary embodiments are described in detail with reference to the accompanying drawings. These embodiments are not limiting, and in these embodiments, in which like reference numerals represent similar structures, and wherein.

Figure 1:
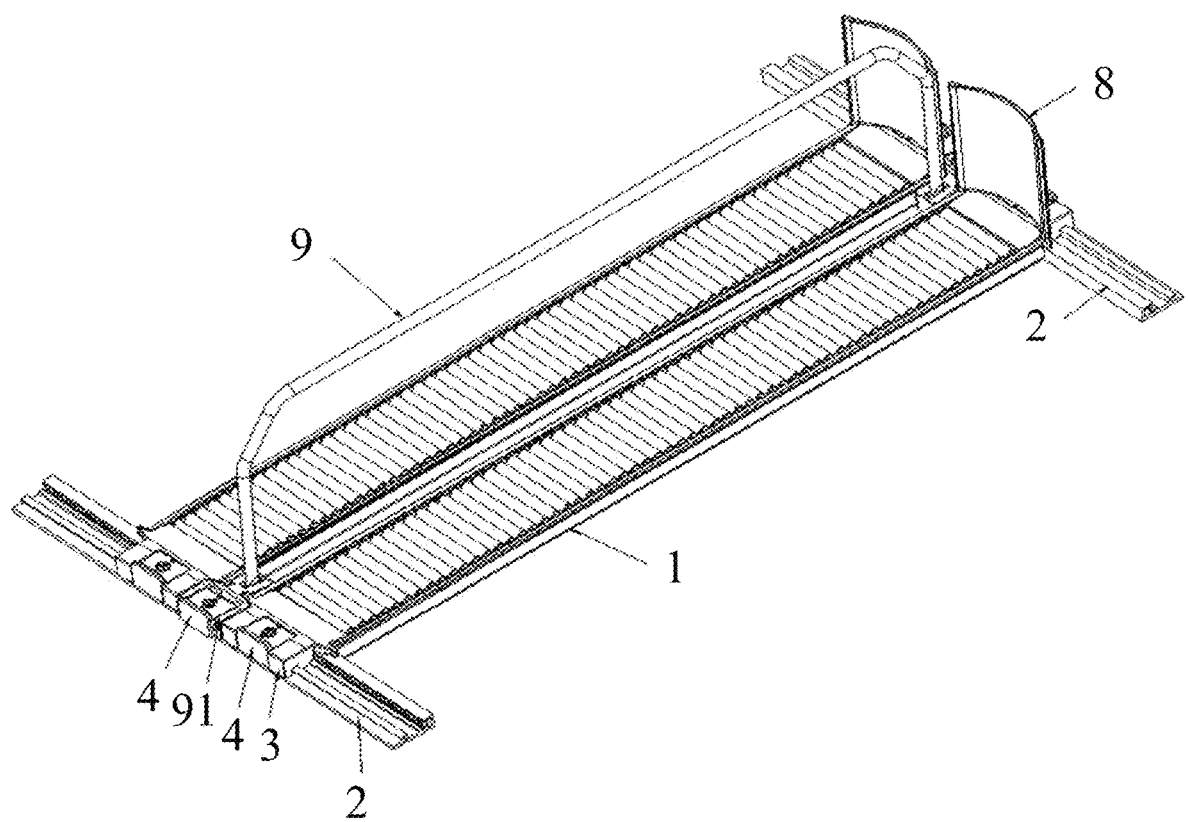
FIG. 1 is a schematic diagram illustrating a three-dimensional structure according to embodiment 1 of the present disclosure.

REFERENCE SIGNS 1-chute; 2-cross beam; 21-first limiting member; 211-rack; 2111-first catch; 212-long strip; 213-circular hole; 22-second limiting member; 221-slot; 222-cam; 223-limiting slot; 23-retaining groove; 3-chute plug; 31-receiving groove; 311-limiting block; 32-snap slot; 33-spring; 34-bearing plate; 4-movable switch; 41-limiting protrusion; 42-snap; 43-horizontal swivel; 44-sliding groove; 45-stopper; 46-toggle protrusion; 47-groove; 48-pressing portion; 5-first mating member; 51-catch tooth; 52-circular rod; 6-second mating member; 61-catch member; 62-L-shaped member; 7-connecting member; 71-sloping groove; 8-baffle plate; 9-divider bar; 91-divider bar plug.

DETAILED DESCRIPTION

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system", "device", "unit" and/or "module" as used herein is a manner used to distinguish different components, elements, parts, sections, or assemblies at different levels. However, if other words serve the same purpose, the words may be replaced by other expressions.

As shown in the present disclosure and claims, the words "one", "a", "a kind" and/or "the" are not especially singular but may include the plural unless the context expressly suggests otherwise. In general, the terms "comprise", "comprises", "comprising", "include", "includes", and/or "including", merely prompt to include operations and elements that have been clearly identified, and these operations and elements do not constitute an exclusive listing. The methods or devices may also include other operations or elements.

Some embodiments of the present disclosure provide an adjustable chute structure (hereinafter referred to as "chute structure"). As shown in FIG. 1-FIG. 23, the chute structure includes at least one chute 1 and two cross beams 2 disposed at two ends of the chute 1. Each of the two ends of the chute 1 are connected to a chute plug 3, and the chute plug 3 is slidably mounted on the two cross beams 2. The chute plug 3 is provided with a receiving groove 31, the receiving groove 31 is provided with a movable switch 4, and a first mating member 5 and a second mating member 6 coupled with the movable switch 4. The two cross beams 2 are provided with a plurality of first limiting members 21 arranged consecutively in a lengthwise direction, and the chute 1 engages or plug-fits with the first limiting member 21 through the first mating member 5, to fix the chute 1 between the two cross beams 2 in a transverse direction. Each of the two cross beams 2 is provided with a second limiting member 22, and the chute 1 is interlocked and connected with the second limiting member 22 through the second mating member 6, to fix the chute 1 to the two cross beams 2 in a longitudinal direction.

The chute 1 refers to a channel configured for objects or items to slide through.

The two cross beams 2 are configured to support and fix the chute 1. In some embodiments, one or more chutes I may be provided between the two cross beams 2, and the specific count of the chutes may be determined according to actual application requirements.

The chute plug 3 is configured to connect the cross beams 2 and the chute 1. In some embodiments, the chute plug 3 may be fixedly connected to the two ends of the chute 1, and slidingly connected to the cross beams 2. The fixed connection may be realized by threaded connection, interlocked connection, welding, or the like. The manner of realizing the sliding connection may include but is not limited to a sliding groove and slider structure, a rolling guide structure, or the like.

The receiving groove 31 is configured to accommodate the movable switch 4, and the first mating member 5 and the second mating member 6 coupled to the movable switch 4. It will be appreciated that the receiving groove 31 may be adaptively designed to accommodate the movable switch 4, and the first mating member 5 and the second mating member 6 coupled with the movable switch 4.

The movable switch 4 refers to a component configured to control the linkage operation of the first mating member 5 and the second mating member 6. In some embodiments, the movable switch 4 may be coupled with the first mating member 5 and the second mating member 6 for fixing the chute 1 between the two cross beams 2 in the transverse or longitudinal directions or removing the chute 1 from between the two cross beams 2. The transverse direction refers to a lengthwise direction of the cross beams 2. The longitudinal direction refers to a widthwise direction of the cross beams 2, i.e., a direction perpendicular to the lengthwise direction of the cross beams 2.

In some embodiments, the first mating member 5 may cooperate with the first limiting member 21 to fix the chute 1 between the two cross beams 2 in the transverse direction. For example, the first mating member 5 may be a snap, and the first limiting member 21 may be a slot. Through the cooperation between the snap and the slot, the chute 1 is fixed between the two cross beams 2 in the transverse direction.

In some embodiments, there are a plurality of first limiting members 21, and the plurality of first limiting members 21 are arranged continuously along the lengthwise direction of the cross beam 2. The continuously arrangement may be understood as the first limiting members 21 being provided on the cross beams 2 at equal intervals along the lengthwise direction of the cross beams 2.

It should be noted that there is no limit to the structural forms of the first mating member 5 and the first limiting member 21, provided that the chute I can be fixed between the two cross beams 2 in the transverse direction.

In some embodiments, the second mating member 6 may cooperate with the second limiting member 22 to fix the chute 1 between the two cross beams 2 in the longitudinal direction. For example, the second mating member 6 may be a slider, and the second limiting member 22 may be a sliding groove extending along the lengthwise direction of the cross beams 2 to fix the chute 1 between the two cross beams 2 in the longitudinal direction through snapping the slider into the sliding groove.

Similarly, the second mating member 6 and the second limiting member 22 are of unlimited structural forms, provided that the chute I can be fixed between the two cross beams 2 in the longitudinal direction.

More descriptions regarding the chute may be found in the relevant descriptions hereinafter (e.g., embodiments 1-6).

In some embodiments of the present disclosure, the chute 1 engages or plug-fits with the first limiting member 21 through the first mating member 5, to fix the chute 1 between the two cross beams 2 in the transverse direction. There are a plurality of first limiting members 21, and by engaging or plug-fitting with different first limiting members 21, the first mating member 5 enables adjustment of both the position of the chute 1 and the spacing between two adjacent chutes 1. When the first mating member 5 engages or plug-fits with the first limiting member 21, the chute 1 cannot move on the cross beams 2, the chute 1 is locked in its original position in the transverse direction, and the spacing between two adjacent chutes 1 is fixed, which can improve the stability and quality of the entire chute product.

Further, the chute 1 is fixed on the two cross beams 2 in the longitudinal direction through the interlocked connection between the second mating member 6 and the second limiting member 22. Since the chute I cannot move transversely on the cross beams 2 after the chute 1 is fixed transversely, that is, the chute plug 3 connected with the chute 1 and the movable switch 4 in the receiving groove 31 of the chute plug 3 are unable to move transversely, when the second mating member 6 snaps with the second limiting member 22, friction may not be produced in a transverse direction. The friction between the second mating member 6 and the second limiting member 22 is smaller compared to the existing snap-fit structure, and the friction failure between the second mating member 6 and the second limiting member 22 can be retarded, thereby extending the service life of the entire chute product.

In addition, the movable switch 4 is coupled with the first mating member 5 and the second mating member 6, and when the movable switch 4 is actuated, the first mating member 5 and the second mating member 6 may be simultaneously driven to move, so that the first mating member 5 engages or plug-fits with the first limiting member 21 while the second mating member 6 snaps with the second limiting member 22, thereby fixing the chute 1 between the two cross beams 2 in the transverse and longitudinal directions. Furthermore, the first mating member 5 is loosened from the first limiting member 21 while the second mating member 6 is loosened from the second limiting member 22, to enable the whole chute 1 to be taken out from between the two cross beams 2, facilitating the installation and locking of the chute 1.

Embodiment 1

Figure 2:
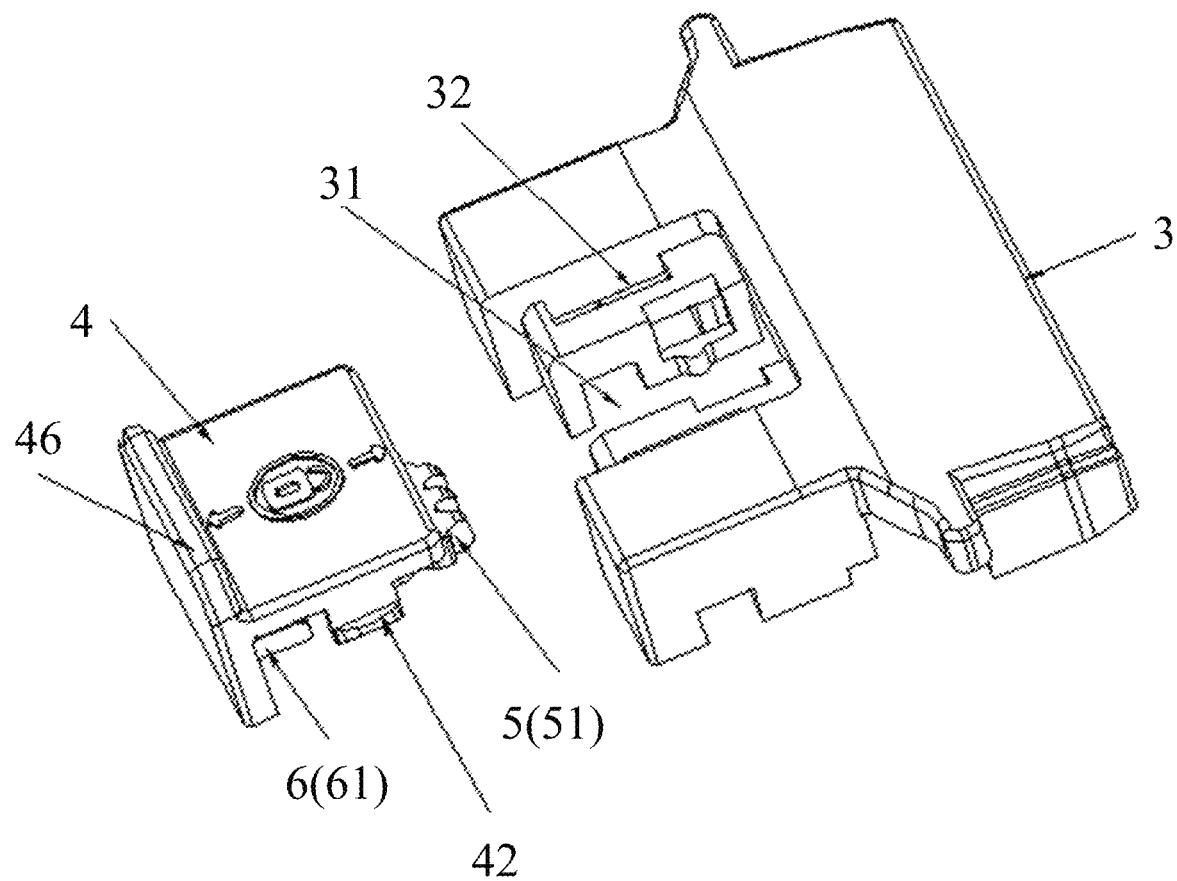
FIG. 2 is a schematic diagram illustrating a disassembled structure of a chute plug and a movable switch according to embodiment 1 of the present disclosure.
Figure 3:
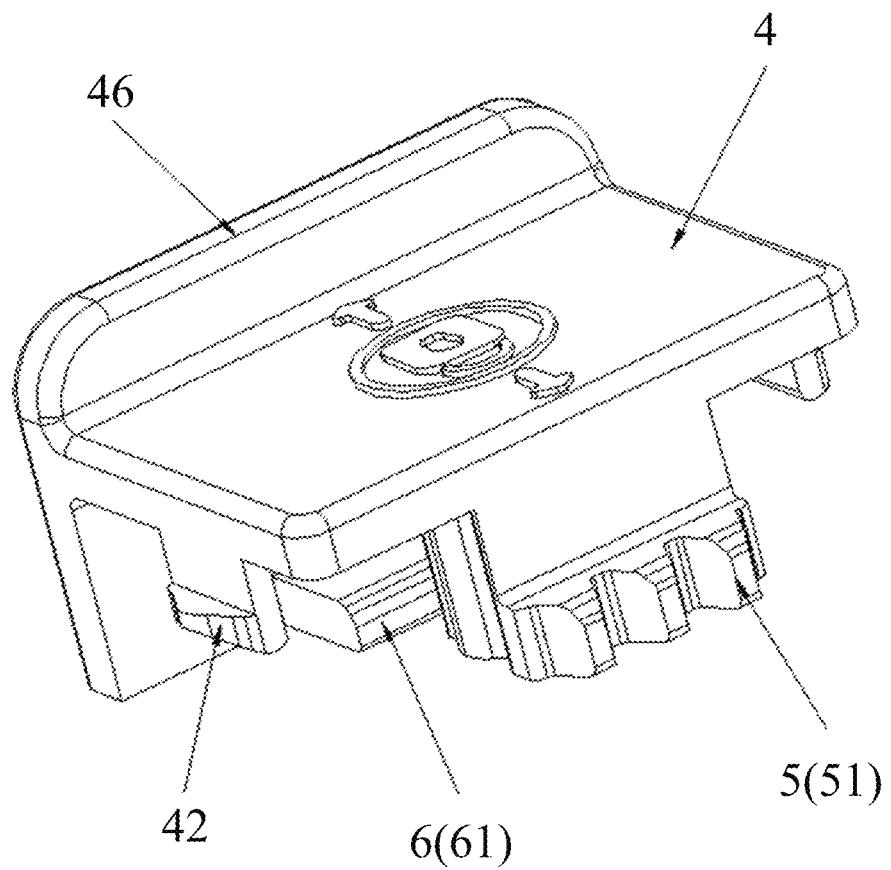
FIG. 3 is a schematic diagram illustrating a three-dimensional structure of a movable switch according to embodiment 1 of the present disclosure.
Figure 4:
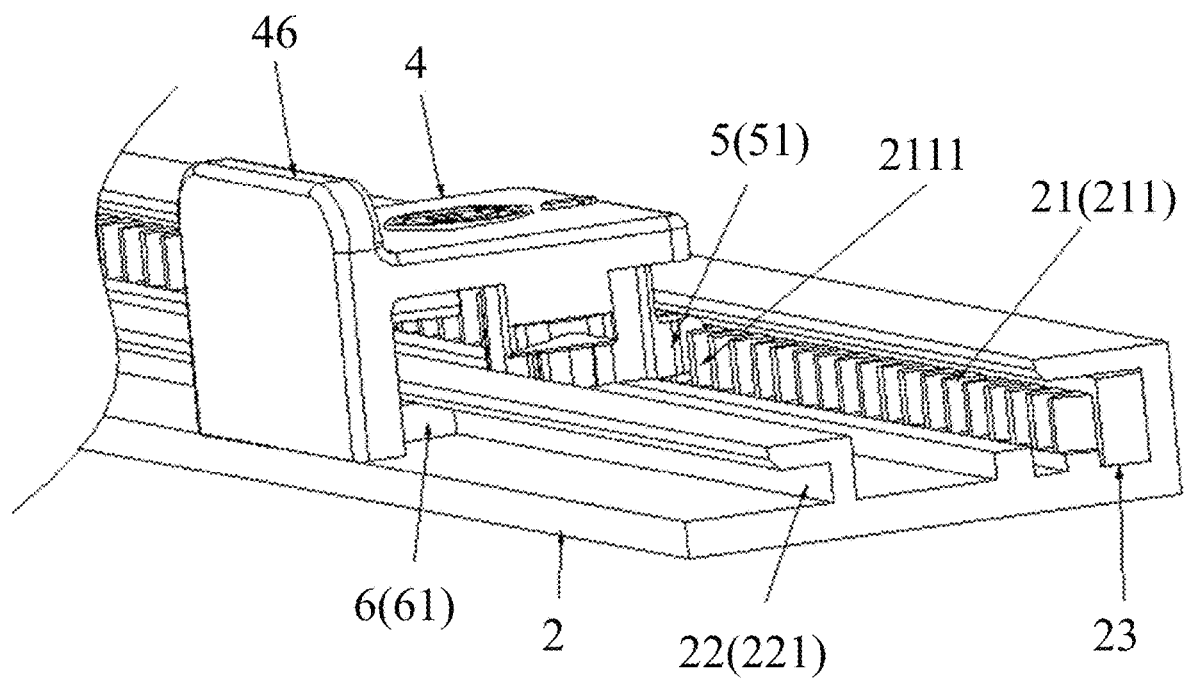
FIG. 4 is a schematic diagram illustrating a three-dimensional structure of a movable switch and a cross beam according to embodiment 1 of the present disclosure.

FIG. 1 is a schematic diagram illustrating a three-dimensional structure according to embodiment 1 of the present disclosure. FIG. 2 is a schematic diagram illustrating a disassembled structure of a chute plug and a movable switch according to embodiment 1 of the present disclosure. FIG. 3 is a schematic diagram illustrating a three-dimensional structure of a movable switch according to embodiment 1 of the present disclosure. FIG. 4 is a schematic diagram illustrating a three-dimensional structure of a movable switch and a cross beam according to embodiment 1 of the present disclosure.

Referring to FIG. 1 to FIG. 4, the embodiment provides an adjustable chute including at least one chute 1 and two cross beams 2 disposed at two ends of the chute 1. Each end of the chute 1 is connected with a chute plug 3, and the chute plug 3 is slidably mounted on the cross beam 2. The chute plug 3 is provided with a receiving groove 31, and the receiving groove 31 is provided with a movable switch 4, as well as a first mating member 5 and a second mating member 6 coupled with the movable switch 4. The cross beams 2 are provided with a plurality of first limiting members 21 arranged consecutively in a lengthwise direction, and the chute 1 engages with the first limiting member 21 by the first mating member 5 to fix the chute 1 between the two cross beams 2 in the transverse direction. The cross beams 2 are provided with a second limiting member 22, and the chute 1 is interlocked and connected with the second limiting member 22 through the second mating member 6 to fix the chute 1 to the two cross beams 2 in the longitudinal direction.

In this embodiment, as shown in FIG. 4, a cross beam 2 is provided with a retaining groove 23, the first limiting member 21 is a rack 211 fixed within the retaining groove 23, the rack 211 is provided with successive first catches 2111, and the first mating member 5 is a catch tooth 51, with the first catches 2111 engaging with the catch tooth 51.

The retaining groove 23 is configured to mount and fix the rack 211. In some embodiments, the retaining groove 23 is provided on the cross beam 2 along the lengthwise direction of the cross beam 2. The rack 211 refers to a component fixed in the retaining groove 23. The rack 211 may be a straight-tooth rack or a helical-tooth rack. The first catches 2111 refer to serially aligned surface recessions on the surface of the rack 211. The catch tooth 51 refers to a member that engages with the first catches 2111.

In this embodiment, the chute plug 3 is in position-limiting fixation with the cross beam 2 in a transverse direction, so that the chute I connected with the chute plug 3 is fixed between the two cross beams 2 in the transverse direction, and the chute 1 is unable to be moved on the two cross beams 2 in the transverse direction, and the chute 1 is locked in the transverse direction. Moreover, the spacing between adjacent chutes 1 is fixed, which can improve the stability and quality of the entire chute product. The catch tooth 51 may be interlocked into the first catches 2111 on the cross beam 2, to fix the adjusted position of the chute 1 in the transverse direction. The first catches 2111 are continuously arranged, thereby allowing for stepless positional adjustment to meet the user's requirement for matching goods of different sizes. When it is necessary to adjust the position of the chute 1, the catch tooth 51 is detached from the first catches 2111 on the cross beam 2, and the position of the chute 1 is readjusted to match the size of commodities, so that the spacing of the chute 1 may be flexibly adjusted during use. In some embodiments, it is also possible to dispense with the retaining groove 23, and the rack 211 is integrally molded with the cross beam 2.

In this embodiment, as shown in FIG. 4, the second limiting member 22 is a slot 221 provided on a top surface of the cross beam 2, the second mating member 6 is a catch member 61, and the catch member 61 is interlocked and connected with the slot 221. The slot 221 may be provided on the top surface of the cross beam 2 along the lengthwise direction of the cross beam 2.

When the catch member 61 is interlocked and connected with the slot 221, the chute plug 3 is in position-limiting fixation with the cross beam 2 in an upward and downward direction, to enable the chute 1, which is connected with the chute plug 3, to be fixed to two cross beams 2 in the longitudinal direction. The catch member 61 may be interlocked into the slot 221 to fix the chute 1, whose transverse position is adjusted, in the longitudinal direction. Since the chute 1 cannot be moved on the cross beam 2 after the chute 1 is fixed in the transverse direction, when the catch member 61 interlocked with the slot 221, no friction may be produced between the catch member 61 and the slot 221 in the transverse direction, and the friction between the second mating member 6 and the second limiting member 22 is smaller compared to the existing snap-fit structure.

In this embodiment, as shown in FIG. 2-FIG. 4, both the catch tooth 51 and the catch member 61 are fixedly provided on a bottom surface of the movable switch 4, to cause the movable switch 4 to drive the catch tooth 51 and the catch member 61 to move.

In this embodiment, the movable switch 4 is a forward-backward slide switch. When the movable switch 4 is pushed forward and backward, the catch tooth 51 and the catch member 61 move forward and backward with the movable switch 4. In this embodiment, the movable switch 4, the catch tooth 51, and the catch member 61 are integrally molded, and the catch tooth 51 and the catch member 61 may also be removably fixed on the bottom surface of the movable switch 4.

Further, in order to prevent the movable switch 4 from being dislodged from the receiving groove 31 and to enable the movable switch 4 to be pushed forward and backward, as shown in FIG. 2, a plurality of snaps 42 are provided on the bottom surface of the movable switch 4, and a plurality of snap slots 32 are provided in the receiving groove 31. The snaps 42 are snap-fitted in the snap slots 32 to enable the movable switch 4 to be slidably mounted in the receiving groove 31.

The movable switch 4 may slide forward and backward within the snap slots 32. When the movable switch 4 is smoothly moved forward and backward with respect to the chute plug 3, the interlocked connection between the catch member 61 on the bottom surface of the movable switch 4 and the slot 221 on the cross beam 2 may be changed, and the engagement between the catch tooth 51 on the bottom surface of the movable switch 4 and the first catch 2111 on the cross beam 2 may also be changed.

When the movable switch 4 is pushed forward, the catch member 61 is driven into the slot 221, and the catch tooth 51 is engaged with the first catch 2111. At this time, the positions of the chute plug 3 and the chute 1 are completely fixed, and the chute plug 3 and the chute 1 are impossible to move in the transverse and longitudinal directions, to achieve stabilization and firmness, so that the chute plug 3 cannot be separated from the cross beam 2 to be picked separately.

When the movable switch 4 is pushed backward, the catch member 61 is driven to leave the slot 221, the chute plug 3 together with the chute may be moved in the longitudinal direction, the catch tooth 51 and the first catch 2111 are in a disengaged state, and the chute plug 3 together with the chute may be moved in the transverse direction of the cross beam 2, realizing the adjustment of the spacing between chutes 1, and the chute plug 3 may be taken up separately from the cross beam 2. After the spacing between the chutes 1 is adjusted to be appropriate, by pushing forward the movable switch 4, the catch tooth 51 is re-engaged with the first catch 2111, the catch member 61 enters into the slot 221, and the chute 1 is fully fixed on the two cross beams 2.

Further, in ensuring that the catch tooth 51 and the catch member 61 can be moved by pushing the movable switch 4, the states of both the movable switch 4 and the chute plug 3 may be configured in correspondence. For example, when the movable switch 4 is pushed forward, the catch member 61 enters the slot 221, the catch tooth 51 engages with the first catch 2111, the chute plug 3 together with the chute 1 are in a locked state, and the chute 1 cannot be moved. Alternatively, when the movable switch 4 is pushed forward, the catch member 61 leaves the slot 221, the catch tooth 51 and the first catch 2111 are in a disengaged state, the chute plug 3 and the chute 1 are in an unlocked state, and the chute 1 can be moved. It should be noted that the movement direction of the movable switch 4 and the chute plug 3 cooperating with each other may be set according to the actual situation, provided that the switching between the locked state and the unlocked state of the chute plug 3 is achieved.

In this embodiment, the chute 1 is a ball chute. In other embodiments, the chute 1 may also be a veneer chute, a mesh chute, a thruster chute, etc.

In this embodiment, as shown in FIG. 2-FIG. 4, the movable switch 4 is provided with a toggle protrusion 46 for lending force, and the toggle protrusion 46 is configured to facilitate the user to push the movable switch 4 forward and backward. The toggle protrusion 46 refers to a raised structure provided on the movable switch 4.

In this embodiment, as shown in FIG. 1, a divider bar 9 is provided between two adjacent chutes 1, and the divider bar 9 is configured to separate the chutes 1. The divider bar 9 is fixed on two cross beams 2 using the same plug structure as the chute 1, and specifically, each end of the divider bar 9 is connected with a divider bar plug 91. The divider bar plug 91 is slidably mounted on the cross beams 2 and has the same structure as the chute plug 3. The divider bar plug 91 is also provided with a receiving groove identical to the receiving groove 31, and a movable switch 4, as well as a first mating member 5 and a second mating member 6 coupled with the movable switch 4 are also provided inside the receiving groove. The divider bar 9 is engaged with the first limiting member 21 through the first mating member 5, to fix the divider bar 9 between the two cross beams 2 in the transverse direction. The divider bar 9 is interlocked and connected with the second limiting member 22 by the second mating member 6 to fix the divider bar 9 to the two cross beams 2 in the longitudinal direction.

Embodiment 2

Figure 5:
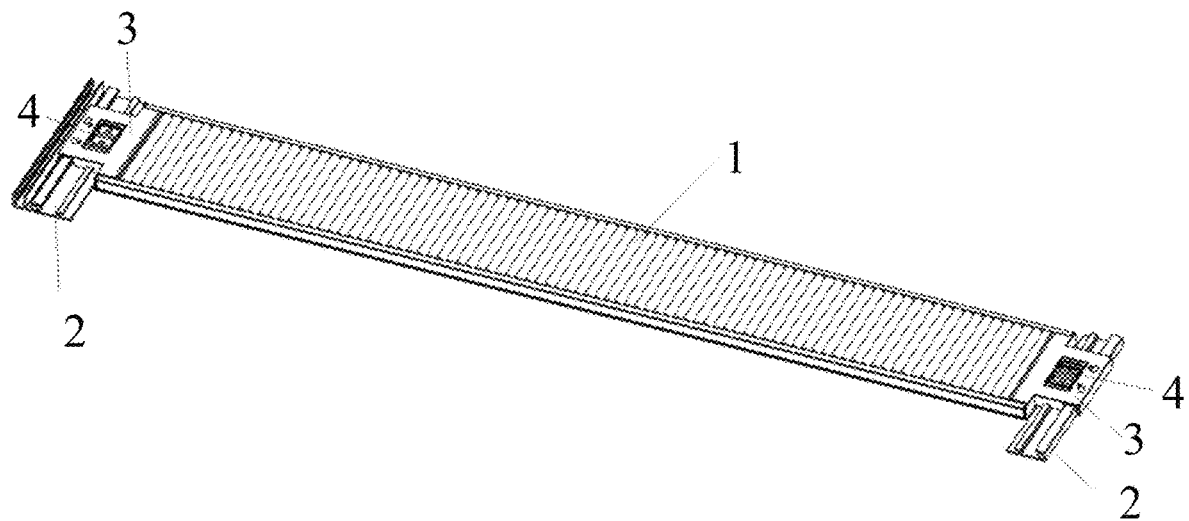
FIG. 5 is a schematic diagram illustrating a three-dimensional structure according to embodiment 2 of the present disclosure.
Figure 6:
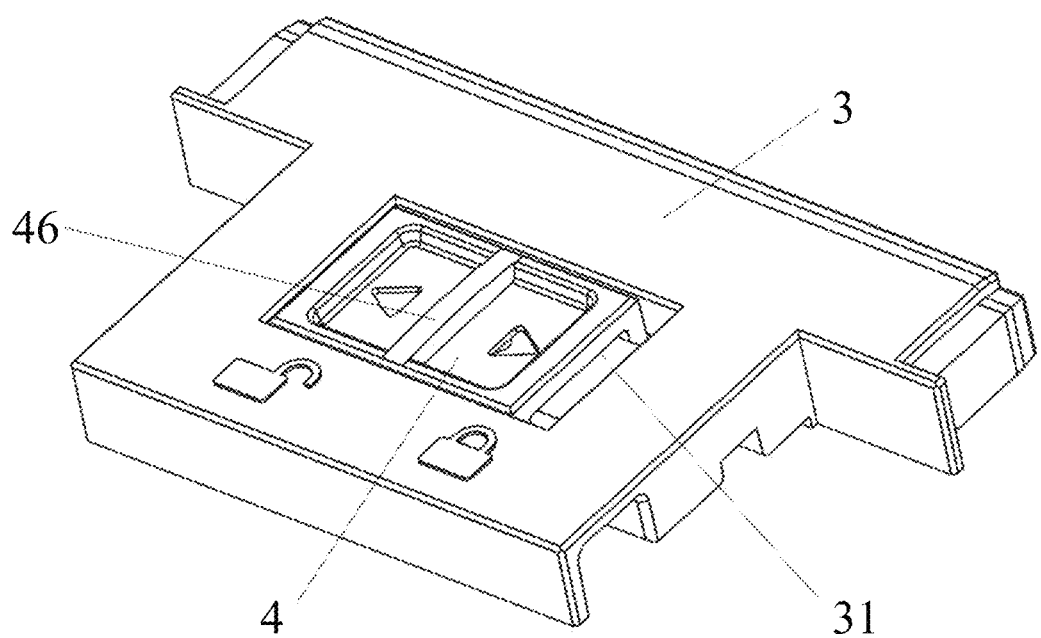
FIG. 6 is a schematic diagram illustrating a three-dimensional structure of a chute plug and a movable switch according to embodiment 2 of the present disclosure.
Figure 7:
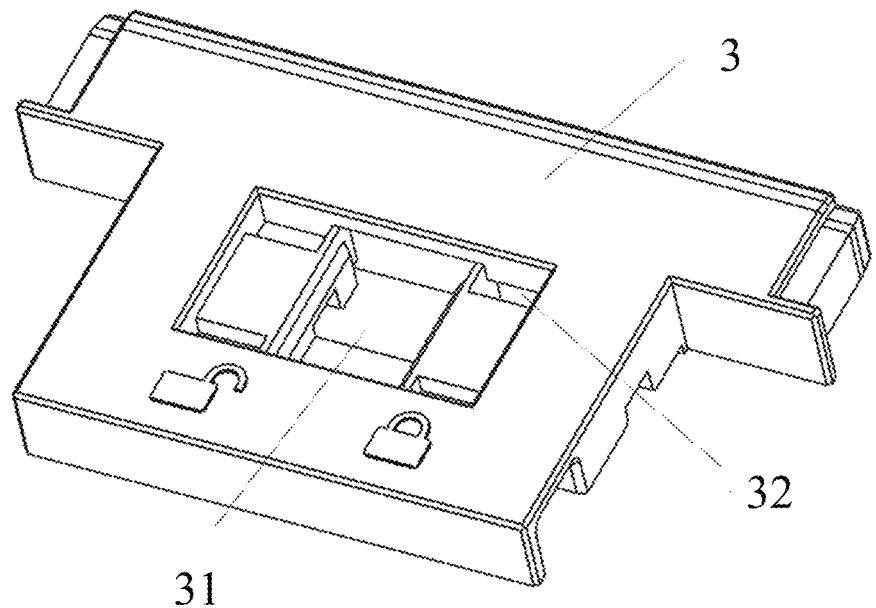
FIG. 7 is a schematic diagram illustrating a three-dimensional structure of a chute plug according to embodiment 2 of the present disclosure.
Figure 8:
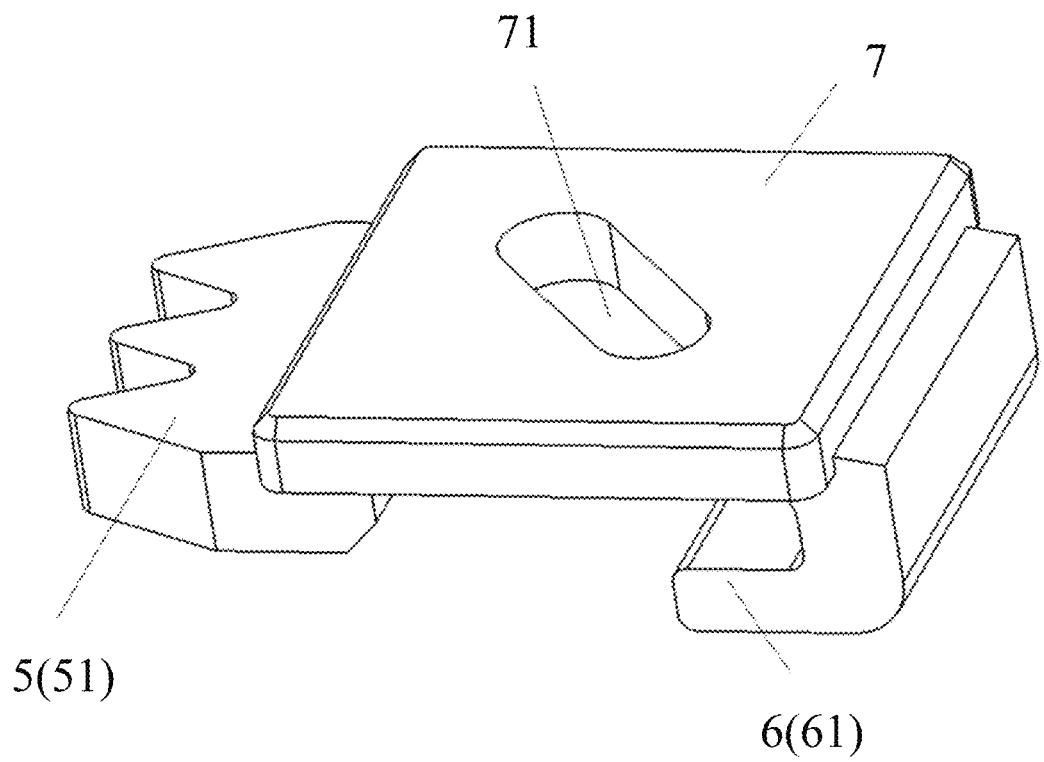
FIG. 8 is a schematic diagram illustrating a three-dimensional structure of a first mating member, a second mating member, and a connecting member according to embodiment 2 of the present disclosure.
Figure 9:
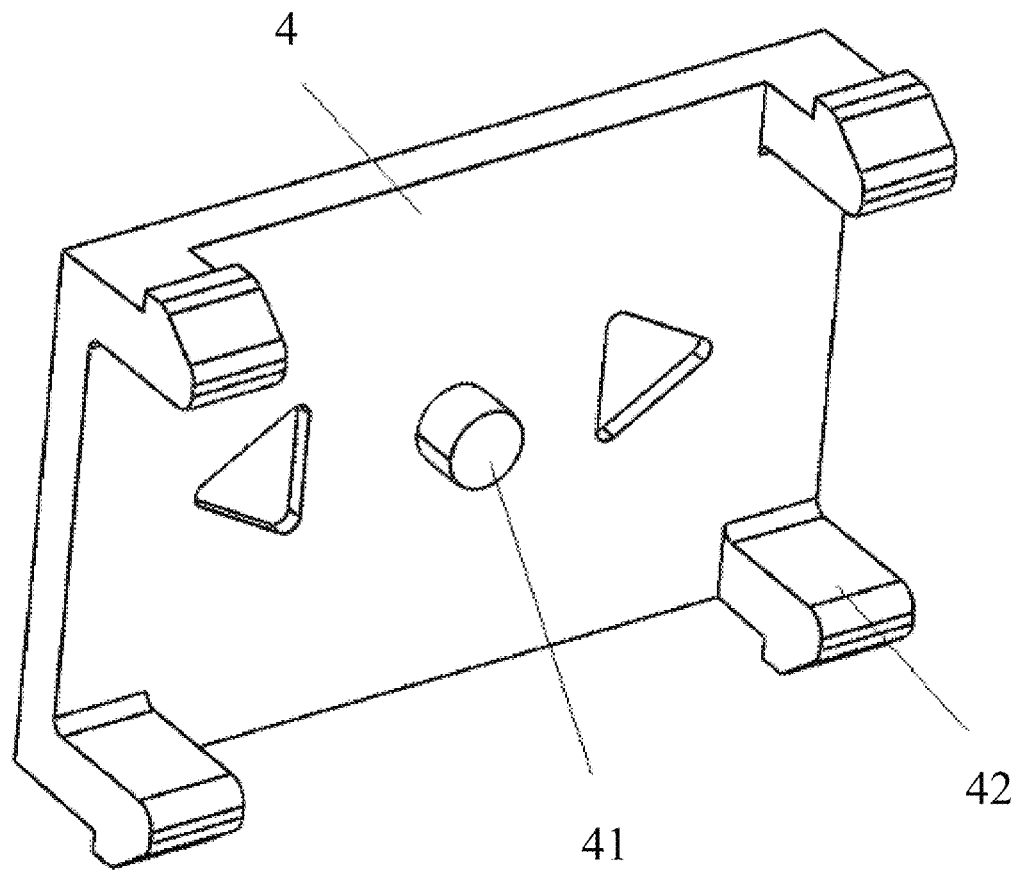
FIG. 9 is a schematic diagram illustrating a three-dimensional structure of a movable switch according to embodiment 2 of the present disclosure.
Figure 10:
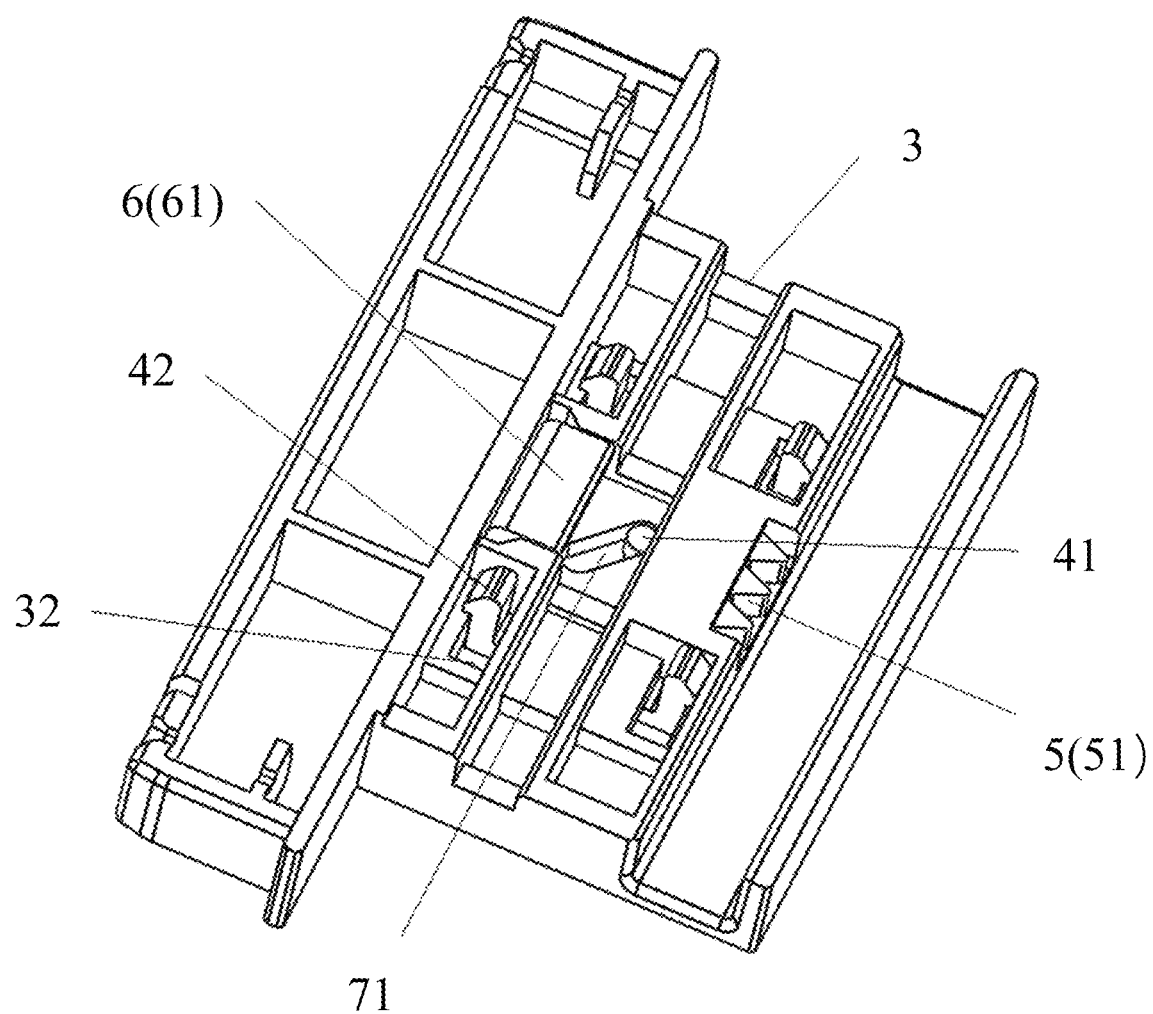
FIG. 10 is a schematic diagram illustrating a three-dimensional structure of a chute plug, a movable switch, and a connecting member according to embodiment 2 of the present disclosure.
Figure 11:
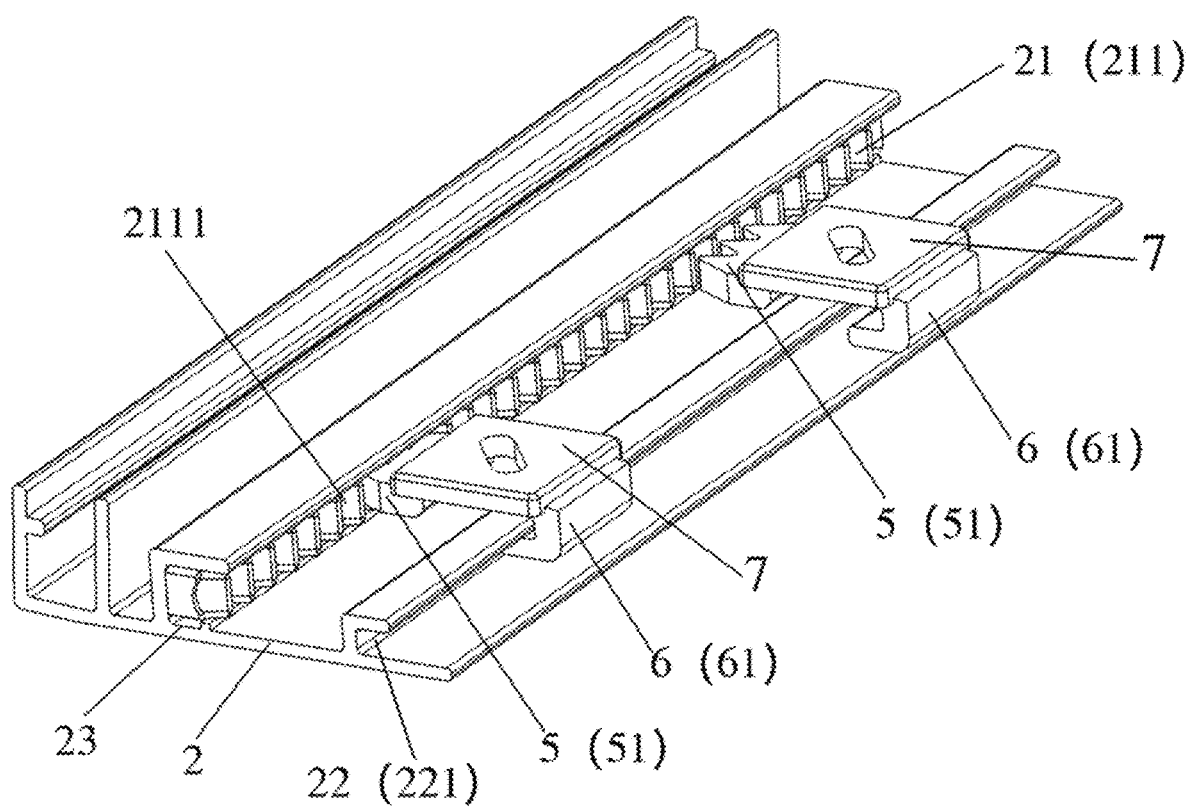
FIG. 11 is a schematic diagram illustrating a three-dimensional structure of a first mating member, a second mating member, a connecting member, and a cross beam according to embodiment 2 of the present disclosure.

FIG. 5 is a schematic diagram illustrating a three-dimensional structure according to embodiment 2 of the present disclosure. FIG. 6 is a schematic diagram illustrating a three-dimensional structure of a chute plug and a movable switch according to embodiment 2 of the present disclosure. FIG. 7 is a schematic diagram illustrating a three-dimensional structure of a chute plug according to embodiment 2 of the present disclosure. FIG. 8 is a schematic diagram illustrating a three-dimensional structure of a first mating member, a second mating member, and a connecting member according to embodiment 2 of the present disclosure. FIG. 9 is a schematic diagram illustrating a three-dimensional structure of a movable switch according to embodiment 2 of the present disclosure. FIG. 10 is a schematic diagram illustrating a three-dimensional structure of a chute plug, a movable switch, and a connecting member according to embodiment 2 of the present disclosure. FIG. 11 is a schematic diagram illustrating a three-dimensional structure of a first mating member, a second mating member, a connecting member, and a cross beam according to embodiment 2 of the present disclosure.

Referring to FIG. 5 to FIG. 11, the present embodiment provides another adjustable chute including at least one chute 1 and two cross beams 2 disposed at two ends of the chute 1. Each end of the chute 1 is connected with a chute plug 3, and the chute plug 3 is slidably mounted on the cross beam 2. The chute plug 3 is provided with a receiving groove 31, and the receiving groove 31 is provided with a movable switch 4, as well as a first mating member 5 and a second mating member 6 coupled with the movable switch 4. The cross beams 2 are provided with a plurality of first limiting members 21 arranged consecutively in a lengthwise direction, and the chute 1 engages with the first limiting member 21 by the first mating member 5 to fix the chute 1 transversely between the two cross beams 2. The cross beams 2 are provided with a second limiting member 22, and the chute 1 is interlocked and connected with the second limiting member 22 through the second mating member 6 to fix the chute 1 to the two cross beams 2 in the longitudinal direction.

As shown in FIG. 8-FIG. 11, the cross beam 2 is provided with a retaining groove 23, the first limiting member 21 is a rack 211 fixed within the retaining groove 23, and the retaining groove 23 is configured to provide the rack 211. The rack 211 is provided with successive first catches 2111, and the first mating member 5 is a catch tooth 51, with the first catches 2111 engaging with the catch tooth 51. The second limiting member 22 is a slot 221 provided on a top surface of the cross beam 2, the second mating member 6 is a catch member 61, and the catch member 61 is interlocked and connected with the slot 221.

Referring to FIG. 8 and FIG. 9, the chute structure provided in the present embodiment further includes a connecting member 7 for connecting the catch tooth 51 and the catch member 61. The connecting member 7 is disposed underneath the movable switch 4, and the connecting member 7 is provided with a sloping groove 71. The bottom surface of the movable switch 4 is provided with a limiting protrusion 41 adapted to the sloping groove 71, and the limiting protrusion 41 is provided in the sloping groove 71 to enable the movable switch 4 to control the movement of the connecting member 7 to drive the catch tooth 51 and the catch member 61 to move.

The sloping groove 71 refers to a sloping groove structure provided on the connecting member 7. The limiting protrusion 41 refers to a raised structure that interfaces with the sloping groove 71. In some embodiments, shapes and sizes of the sloping groove 71 and the limiting protrusion 41 are compatible, which may be set based on the actual application requirements.

In this embodiment, the movable switch 4 is a left-right slide switch. When the movable switch 4 is pushed left and right, the limiting protrusion 41 at a bottom of the movable switch 4 moves within the sloping groove 71. Because the inclined setting of the sloping groove 71 results in the limiting protrusion 41 being restricted by the sloping groove 71 during the moving process, the limiting protrusion 41 may drive the connecting member 7 provided with the sloping groove 71 to move together. The design of the sloping groove 71 allows guiding the connecting member 7 to move backward and forward along a lengthwise direction of the sloping groove 71 when the movable switch 4 is pushed left and right along a width direction of the sloping groove 71.

When the movable switch 4 is pushed to the right, the connecting member 7 moves forward, driving the catch tooth 51 and the catch member 61 to move, so that the catch member 61 enters the slot 221, and the catch tooth 51 engages with the first catch 2111. At this time, the positions of the chute plug 3 and the chute 1 are completely fixed, and the chute plug 3 and the chute 1 are impossible to move in the transverse and longitudinal directions, to achieve stabilization and firmness, so that the chute plug 3 cannot be separated from the cross beam 2 to be picked separately.

When the movable switch 4 is pushed to the left, the connecting member 7 moves backward, driving the catch member 61 to leave the slot 221. The chute plug 3 together with the chute may be moved in the longitudinal direction, driving the catch tooth 51 and causing the catch tooth 51 and the first catch 2111 to be in a disengaged state. The chute plug 3 and the chute may be moved in the transverse direction of the cross beam 2, adjusting the spacing between chutes 1, and the chute plug 3 may be picked up separately from the cross beam 2. After the spacing between the chutes 1 is adjusted to be appropriate, by pushing the movable switch 4 to the right, the catch tooth 51 is re-engaged with the first catch 2111, the catch member 61 enters slot 221, and the chute 1 is fully fixed on the two cross beams 2.

It is understood that, in ensuring that the connecting member 7 can be moved by pushing the movable switch 4, the states of the movable switch 4, the connecting member 7, and the chute plug 3 is configured correspondingly. For example, when the movable switch 4 is toggled to the left then the connecting member 7 moves backward, the catch member 61 enters the slot 221, the catch tooth 51 is engaged with the first catch 2111, the chute plug 3 and the chute 1 is in a locked state, and the chute 1 cannot be moved. Alternatively, when the movable switch 4 is toggled to the left and the connecting member 7 moves forward, the catch member 61 leaves the slot 221, the catch tooth 51 and the first catch 2111 are in a disengaged state, the chute plug 3 and the chute 1 are in an unlocked state, and the chute I can be moved. It should be noted that the movement direction of the movable switch 4 cooperating with the connecting member 7 may be set according to the actual situation, provided that the switching between t the locked state and the unlocked state of the chute plug 3 is achieved.

In the present embodiment, as shown in FIG. 10, a plurality of snaps 42 are provided on the bottom surface of the movable switch 4, and a plurality of snap slots 32 are provided in the receiving groove 31. The snaps 42 are snap-fitted in the snap slots 32 to enable the movable switch 4 to be slidably mounted in the receiving groove 31.

The snaps 42 refer to raised structures provided on the bottom surface of the movable switch 4. The snap slots 32 refer to slot structures that interoperate with the snaps 42. Understandably, the snaps 42 and the snap slots 32 prevent the movable switch 4 from being dislodged from the receiving groove 31 and enable the movable switch 4 to be pushed left and right.

The same as the embodiment 1, the present embodiment may not be provided with the retaining groove 23, and the rack 211 is integrally molded with the cross beam 2, with the first limiting member 21 being the rack 211 fixed on the cross beam 2, the rack 211 being provided with continuous first catches 2111, the first mating member 5 being a catch tooth 51, and the first catch 2111 engaging with the catch tooth 51.

Similarly, the movable switch 4 is provided with a toggle protrusion 46 for lending force, and the toggle protrusion 46 is configured to facilitate the user in pushing the movable switch 4 left and right.

Embodiment 3

Figure 12:
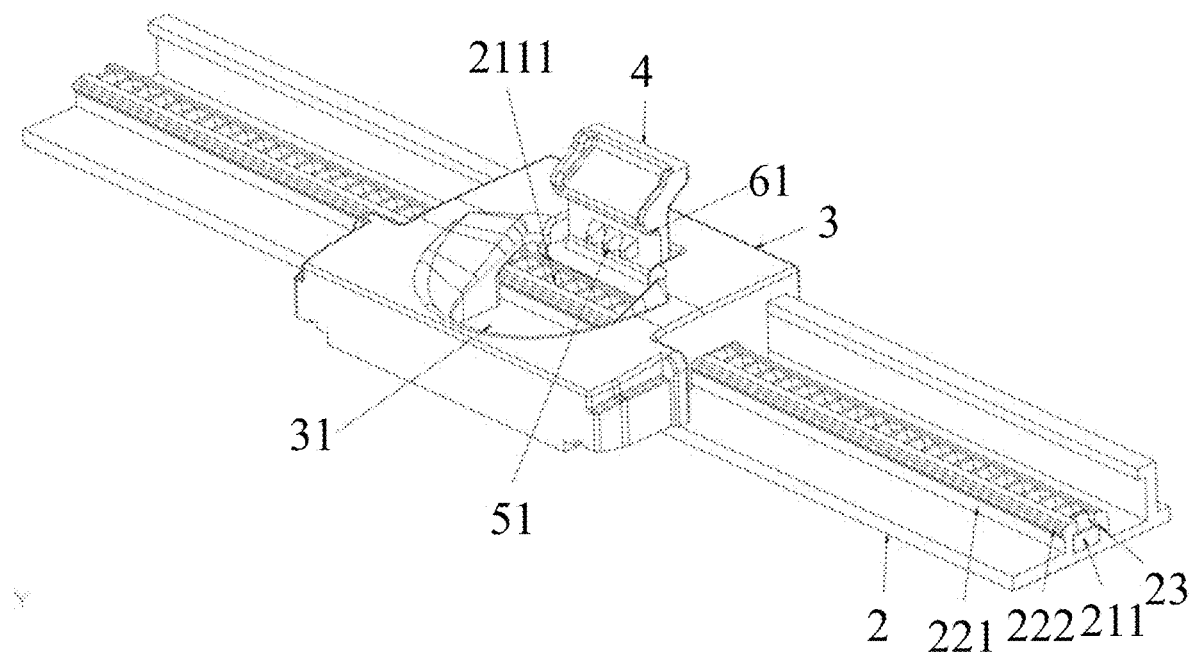
FIG. 12 is a schematic diagram illustrating a three-dimensional structure of a chute plug, a movable switch, and a cross beam according to embodiment 3 of the present disclosure.
Figure 13:
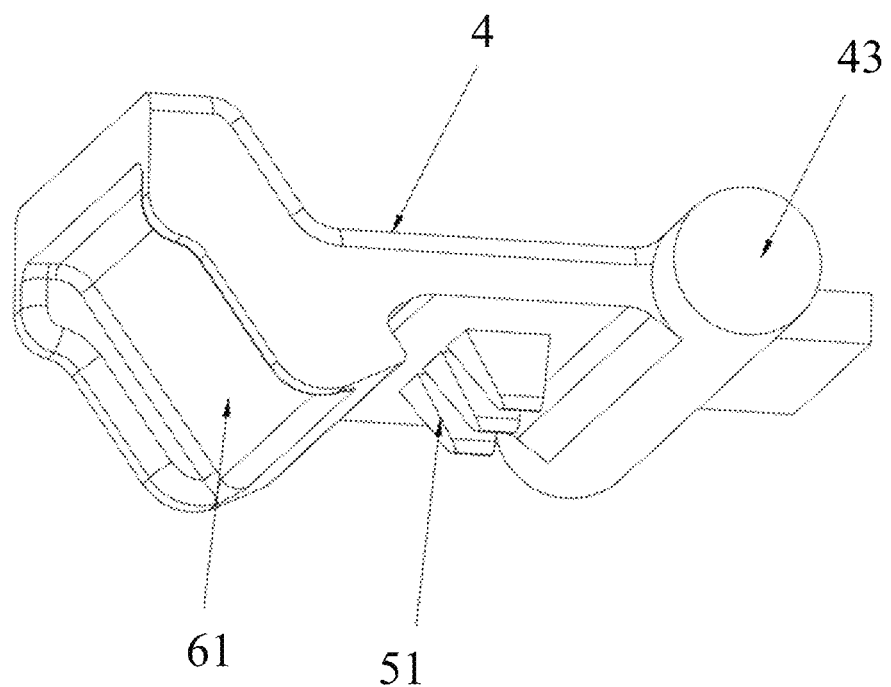
FIG. 13 is a schematic diagram illustrating a three-dimensional structure of a movable switch according to embodiment 3 of the present disclosure.
Figure 14:
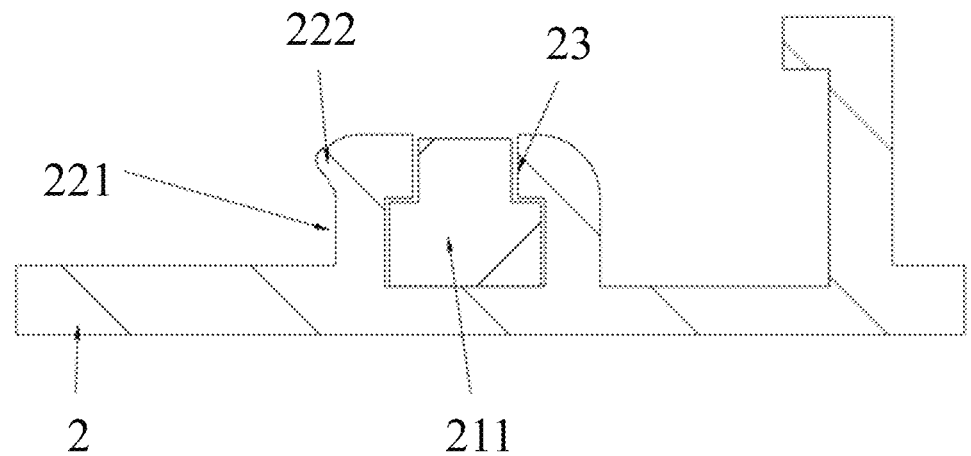
FIG. 14 is a cross-sectional view of a cross beam according to embodiment 3 of the present disclosure.

FIG. 12 is a schematic diagram illustrating a three-dimensional structure of a chute plug, a movable switch, and a cross beam according to embodiment 3 of the present disclosure. FIG. 13 is a schematic diagram illustrating a three-dimensional structure of a movable switch according to embodiment 3 of the present disclosure. FIG. 14 is a cross-sectional view of a cross beam according to embodiment 3 of the present disclosure.

Referring to FIG. 12 to FIG. 14, a chute plug 3 of this embodiment is slidably mounted on a cross beam 2. The chute plug 3 is provided with a receiving groove 31, and a movable switch 4 is provided in the receiving groove 31. The bottom surface of the movable switch 4 is fixedly provided with a catch tooth 51 and a catch member 61, the catch member 61 is a protrusion formed on the bottom surface of the movable switch 4, the catch tooth 51 serves as a first mating member, and the catch member 61 serves as a second mating member. The cross beam 2 is provided with a retaining groove 23, and the retaining groove 23 is provided with a rack 211, the rack 211 is provided with consecutive first catches 2111, the first catches 2111 serve as a first limiting member, and the first catches 2111 engage with the catch tooth 51, enabling the chute plug 3 together with the chute 1 to be fixed between the two cross beams 2 in a transverse direction. The top surface of the cross beam 2 is provided with a slot 221, the slot 221 serves as a second limiting member. The side of the retaining groove 23 in this embodiment extends outwardly to form a cam 222, and the slot 221 is formed by the cam 222, the side of the retaining groove 23, and the top surface of the cross beam 2. The catch member 61 is interlocked and connected with the slot 221 to enable the chute plug 3 together with the chute 1 to be fixed on the two cross beams 2 in a longitudinal direction. The movable switch 4 is a flip-type switch, and when the movable switch 4 is flipped, the catch tooth 51 and the catch member 61 move with the movable switch 4.

In this embodiment, as shown in FIG. 13, a side of the movable switch 4 is provided with a horizontal swivel 43, and two ends of the horizontal swivel 43 are hinged in the receiving groove 31 to enable the movable switch 4 to rotate about the horizontal swivel 43 as an axis. The horizontal swivel 43 refers to an axis around which the movable switch 4 rotates. When the movable switch 4 rotates about the horizontal swivel 43, it drives the catch member 61 into or out of the slot 221 and drives the first catch 2111 to engage or disengage with the catch tooth 51.

When the movable switch 4 is flipped downward, the catch member 61 is driven to enter the slot 221, and the catch tooth 51 is engaged with the first catch 2111. At this time, the positions of the chute plug 3 and the chute 1 are completely fixed, and the chute plug 3 and the chute 1 are impossible to move in the transverse and longitudinal directions, to achieve stabilization and firmness, so that the chute plug 3 cannot be separated from the cross beam 2 to be picked separately.

Referring to FIG. 12, when the movable switch 4 is flipped upwardly, the catch member 61 is driven to leave the slot 221, the chute plug 3 together with the chute may be moved in the longitudinal direction, the catch tooth 51 and the first catch 2111 are in a disengaged state, and the chute plug 3 together with the chute may be moved in the transverse direction of the cross beam 2, realizing the adjustment of the spacing between chutes 1, and the chute plug 3 may be taken up separately from the cross beam 2. After the spacing between the chutes 1 is adjusted to be appropriate, by flipping the movable switch 4 downwardly, the catch tooth 51 is re-engaged with the first catch 2111, the catch member 61 enters the slot 221, and the chute 1 is fully fixed on the two cross beams 2.

Embodiment 4

Figure 15:
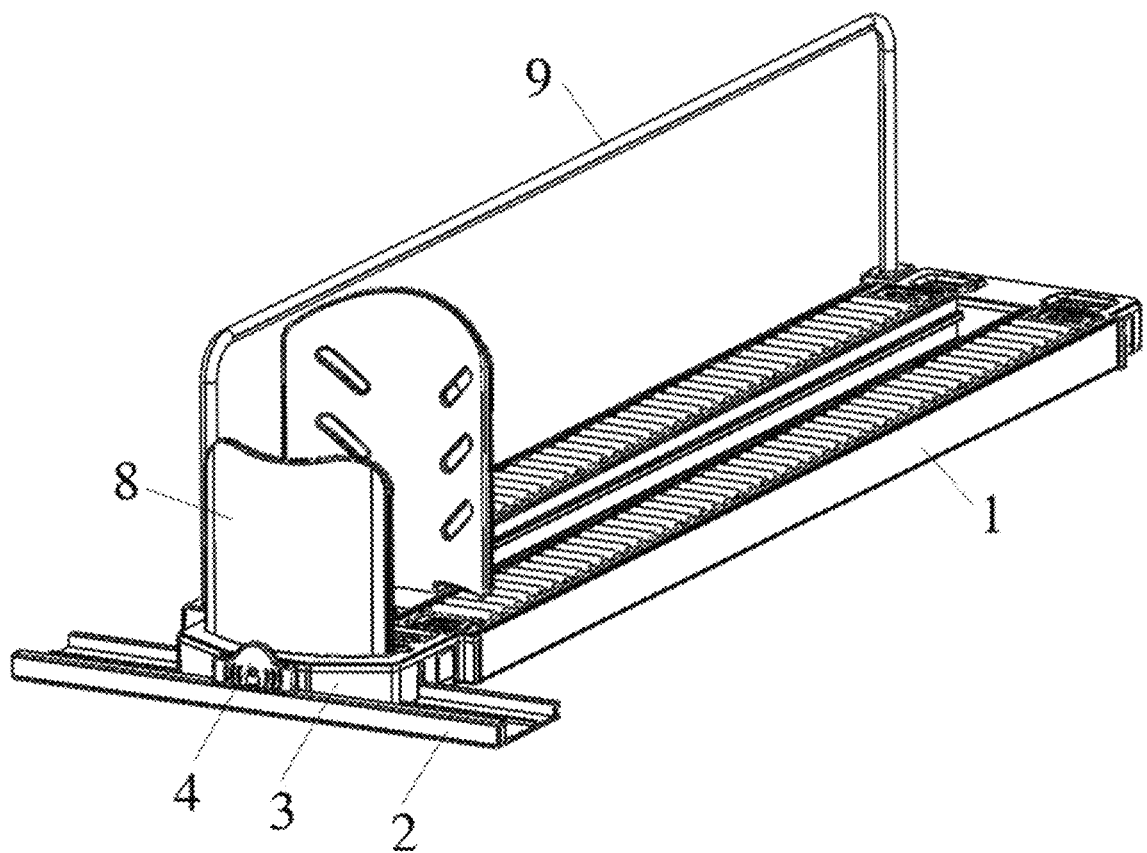
FIG. 15 is a schematic diagram illustrating a three-dimensional structure according to embodiment 4 of the present disclosure.
Figure 16:
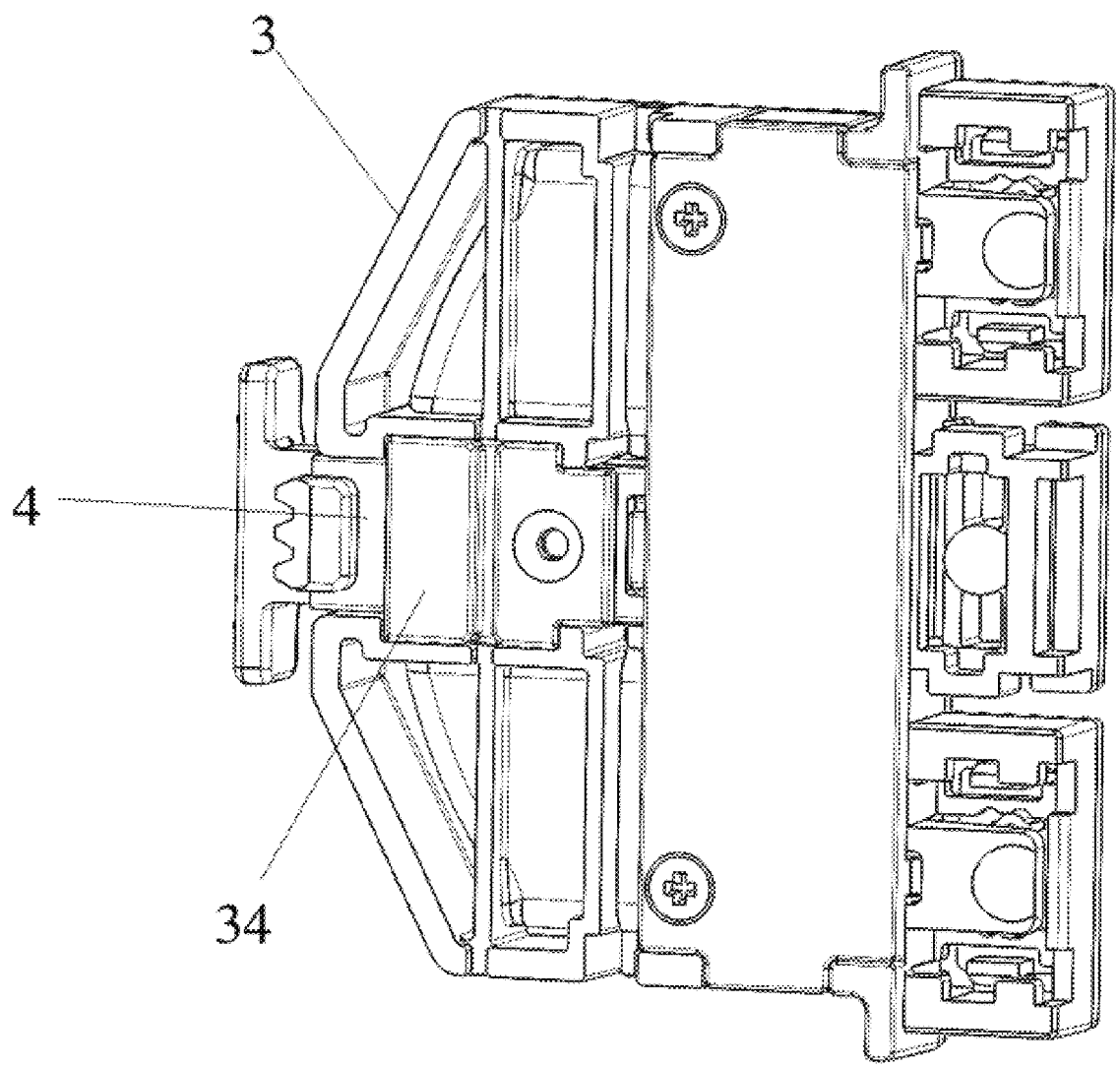
FIG. 16 is a schematic diagram illustrating the three-dimensional structure of a chute plug and a movable switch according to embodiment 4 of the present disclosure.
Figure 17:
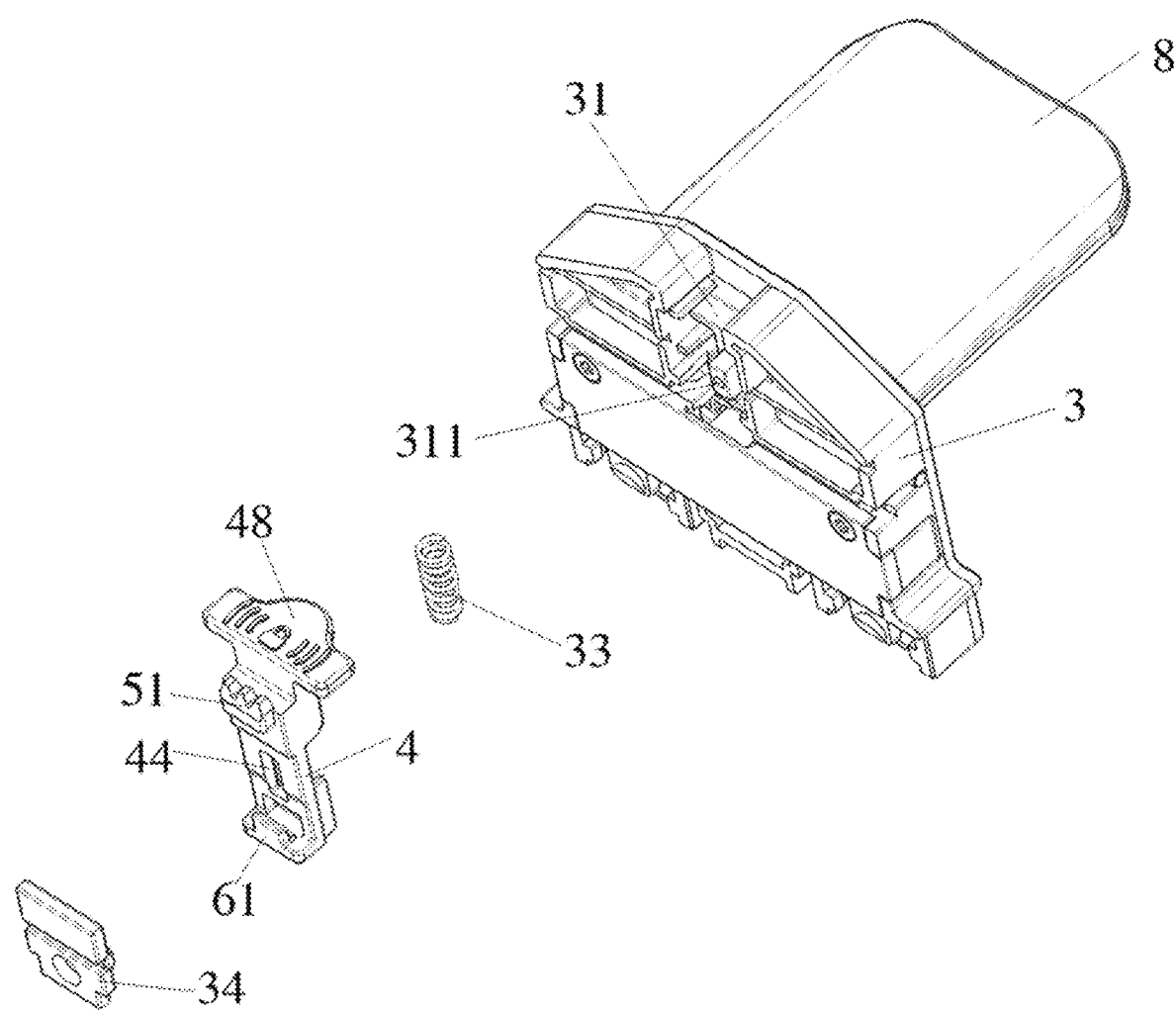
FIG. 17 is a schematic diagram illustrating a disassembled structure according to embodiment 4 of the present disclosure.
Figure 18:
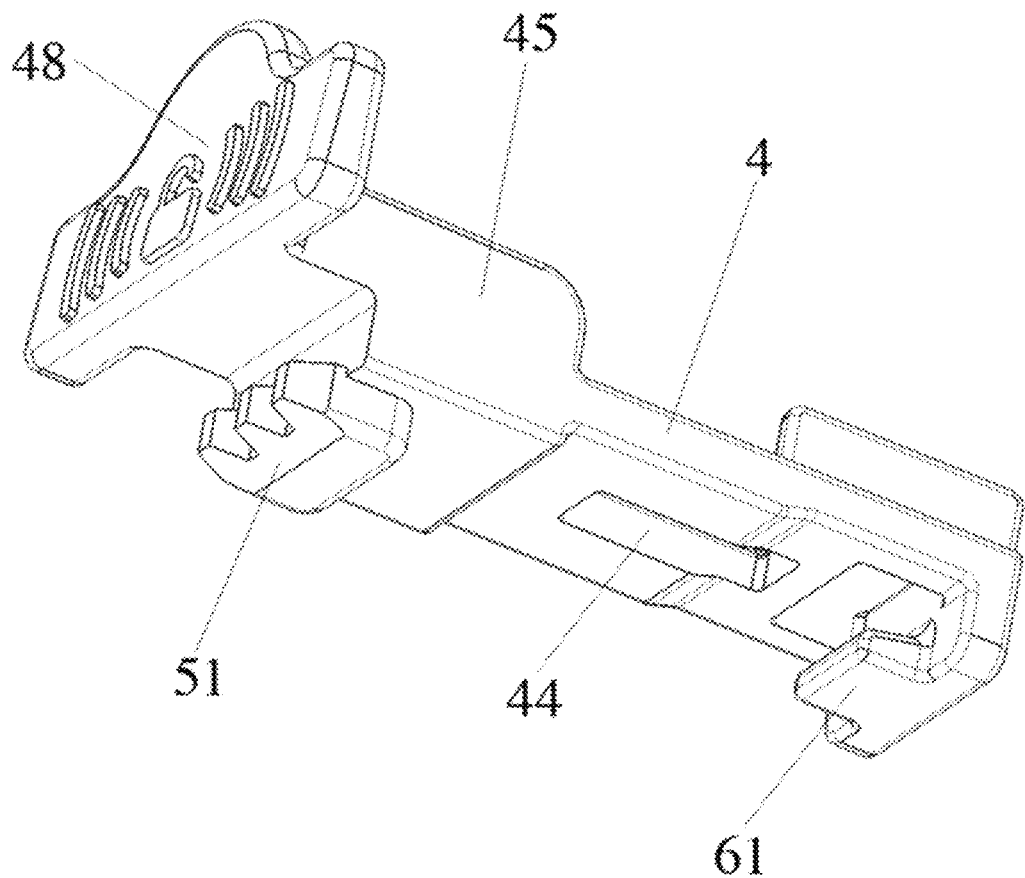
FIG. 18 is a schematic diagram illustrating a three-dimensional structure of a movable switch according to embodiment 4 of the present disclosure.
Figure 19:
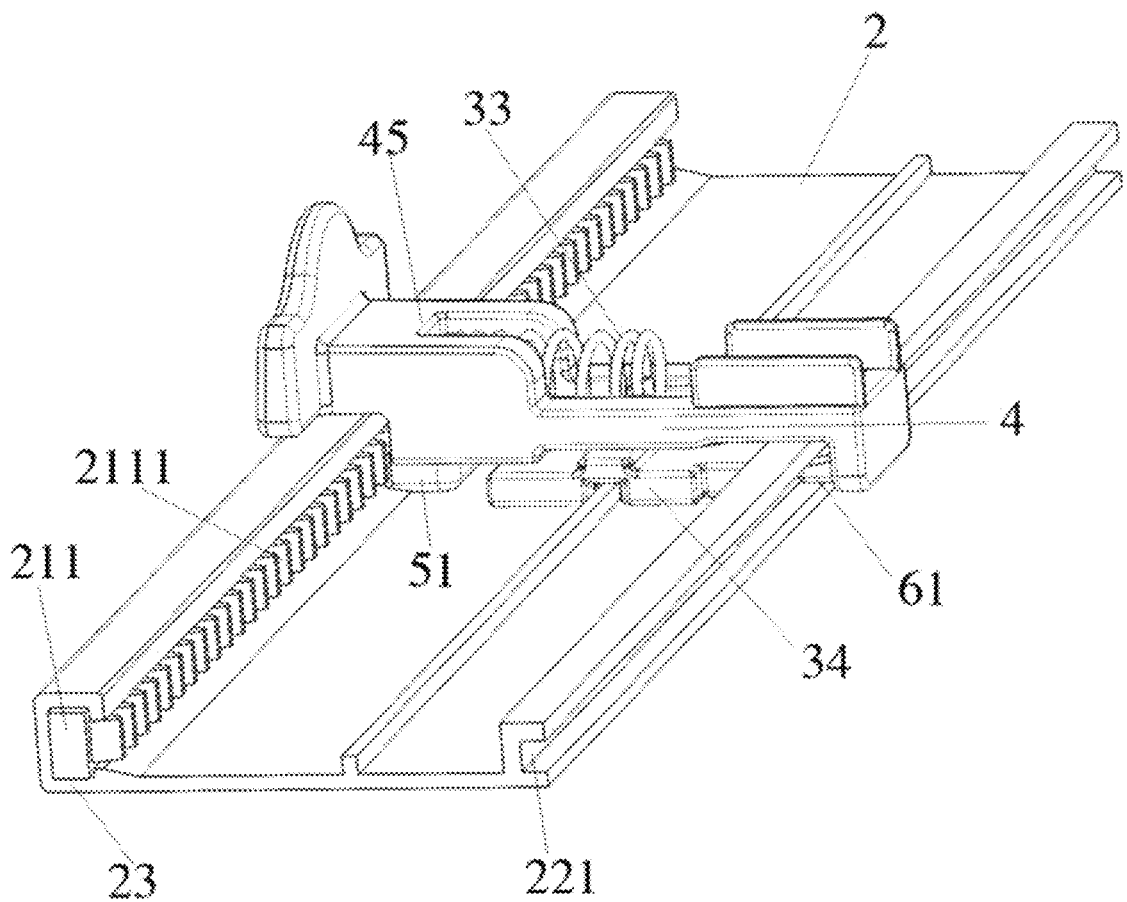
FIG. 19 is a schematic diagram illustrating a three-dimensional structure of a movable switch and a cross beam according to embodiment 4 of the present disclosure.

FIG. 15 is a schematic diagram illustrating a three-dimensional structure according to embodiment 4 of the present disclosure. FIG. 16 is a schematic diagram illustrating the three-dimensional structure of a chute plug and a movable switch according to embodiment 4 of the present disclosure. FIG. 17 is a schematic diagram illustrating a disassembled structure according to embodiment 4 of the present disclosure. FIG. 18 is a schematic diagram illustrating a three-dimensional structure of a movable switch according to embodiment 4 of the present disclosure. FIG. 19 is a schematic diagram illustrating a three-dimensional structure of a movable switch and a cross beam according to embodiment 4 of the present disclosure.

As shown in FIG. 15 to FIG. 19, a chute provided in this embodiment includes at least one chute 1 and two cross beams 2 disposed at the two ends of the chute 1. The chute 1 of this embodiment is a thruster chute, each of the two ends of the chute 1 is connected with a chute plug 3, and the chute plug 3 is slidably mounted on the two cross beams 2. The chute plug 3 is provided with a receiving groove 31, the receiving groove 31 is provided with a movable switch 4. The bottom of the movable switch 4 is provided with a catch tooth 51 and a catch member 61, wherein the catch tooth 51 serves as a first mating member, and the catch member 61 serves as a second mating member. The cross beams 2 are provided with a retaining groove 23, a rack 211 is fixedly provided within the retaining groove 23, and the rack 211 is provided with consecutive first catches 2111, the first catches 2111 serve as a first limiting member, and the first catches 2111 engage with the catch tooth 51, enabling the chute plug 3 to be fixed between the two cross beams 2 in a transverse direction. The top surface of the cross beam 2 is provided with a slot 221, the slot 221 serves as a second limiting member, the catch member 61 is interlocked and connected with the slot 221 to fix the chute 1 on the two cross beams 2 in a longitudinal direction.

In this embodiment, a limiting block 311 is provided in the receiving groove 31, a sliding groove 44 is provided on the movable switch 4, and the limiting block 311 is slidably connected with the sliding groove 44 to enable the movable switch 4 to be slidably mounted in the receiving groove 31. The limiting block 311 refers to a raised structure provided within the receiving groove 31 for limiting the sliding range of the movable switch 4. The sliding groove 44 refers to a slot-like structure provided on the movable switch 4 for slidingly connecting with the limiting block 311.

The movable switch 4 of this embodiment is a push switch. As shown in FIG. 17-FIG. 19, a spring 33 is provided in the receiving groove 31, a stopper 45 is provided on the top surface of the movable switch 4, and two ends of the spring 33 resist against the stopper 45 and the limiting block 311, respectively. Alternatively, the sliding groove 44 is provided with a spring 33, and the two ends of the spring 33 resist against the limiting block 311 and a groove wall of the sliding groove 44, respectively.

In some embodiments, the spring 33 is provided in the receiving groove 31. When the movable switch 4 is pressed and loosened, the interlocked connection between the catch member 61 on the bottom surface of the movable switch 4 and the slot 221 on the cross beams 2 may be changed, and the engagement between the catch tooth 51 on the bottom surface of the movable switch 4 and the first catch 2111 on the cross beams 2 may also be changed.

When pressing the movable switch 4, the stopper 45 presses against the spring 33, at this time, the spring 33 is deformed by the pressure, the movable switch 4 drives the catch member 61 to leave the slot 221, the chute plug 3 together with the chute may be moved in the longitudinal direction, the catch tooth 51 and the first catch 2111 are in a disengaged state, and the chute plug 3 together with the chute may be moved in the transverse direction of the cross beams 2, realizing the adjustment of the spacing between chutes 1, and the chute plug 3 may be taken up separately from the cross beam 2.

After the spacing between chutes 1 is adjusted to be appropriate, the movable switch 4 is loosened, and the spring 33 is reset. The movable switch 4 is moved in a direction opposite to the pressing direction under the spring force of the spring 33 until the stopper 45 is pressed tightly by the spring 33. The stopper 45 is located on the top surface of the movable switch 4, i.e., the movable switch 4 is also pressed, thus the catch member 61 is fasten in the slot 221, and the catch tooth 51 is kept engaged with the first catch 2111. At this time, the positions of the chute plug 3 and the chute 1 are completely fixed, and the chute plug 3 and the chute 1 are impossible to move in the transverse and longitudinal directions, to achieve stabilization and firmness, so that the chute plug 3 cannot be separated from the cross beams 2 to be picked up separately. By setting the spring 33, the chute 1, whose position is adjusted, may be fixed on the cross beams 2 after releasing the movable switch 4, facilitating the locking process of the chute plug 3.

It should be noted that the retaining groove 23 is unnecessary, and the cross beam 2 may not be provided with the retaining groove 23, and the rack 211 may be integrally molded with the cross beam 2, with the first limiting member 21 being the rack 211 fixed on the cross beams 2, the rack 211 being provided with the continuous first catches 2111, the first mating member 5 being the catch tooth 51, and the first catch 2111 engaging with the catch tooth 51.

In other embodiments, the spring 33 is provided in the sliding groove 44, and the two ends of the spring 33 resist against the limiting block 311 and the groove wall of the sliding groove 44, respectively. After the spacing between the chutes 1 is adjusted to be appropriate, the movable switch 4 is loosened, the spring 33 is reset, and the movable switch 4 is moved in the direction opposite to the pressing direction under the spring force of the spring 33 until the catch member 61 is fastened in the slot 221. The catch tooth 51 and the first catch 2111 remain engaged, at this time, the positions of the chute plug 3 and the chute 1 are completely fixed, and the chute plug 3 and the chute 1 are impossible to move in the transverse and longitudinal directions, to achieve stabilization and firmness, so that the chute plug 3 cannot be separated from the cross beams 2 to be picked up separately. By setting the spring 33, the chute 1, whose position is adjusted, may be fixed on the cross beams 2 after releasing the movable switch 4, facilitating the locking process of the chute plug 3.

In the present embodiment, as shown in FIG. 15 and FIG. 17, the chute plug 3 located at each of the two ends of the chute 1 is provided with a baffle plate 8, and one end of the baffle plate 8 serves as a front end for the chute 1, thus the customer does not need to additionally purchase a front baffle plate, which improves efficiency. The baffle plate 8 may be integrally molded with the chute plug 3, or the baffle plate 8 is in removable connection with the chute plug 3. When the baffle plate 8 is in removable connection with the chute plug 3, the product becomes more versatile and flexible, providing the customer with more diverse options. In addition, the baffle plate 8 may be removed during product packaging, maximizing space utilization during the packaging process.

In this embodiment, as shown in FIG. 17-FIG. 18, the movable switch 4 is provided with a pressing portion 48, and the pressing portion 48 partially protrudes from the receiving groove 31, which facilitates the pressing of the movable switch 4. By applying a force to press the pressing portion 48, the entire movable switch 4 may be pressed.

In this embodiment, the front side and the bottom of the receiving groove 31 are open. In order to prevent the movable switch 4 and the spring 33 from being dislodged from the receiving groove 31 when the chute plug 3 and the chute 1 are lifted, a bearing plate 34 is provided at the bottom of the receiving groove 31, which is capable of supporting the movable switch 4 and the spring 33, and the bearing plate 34 may be fixed with screws to the bottom of the receiving groove 31.

Embodiment 5

Figure 20:
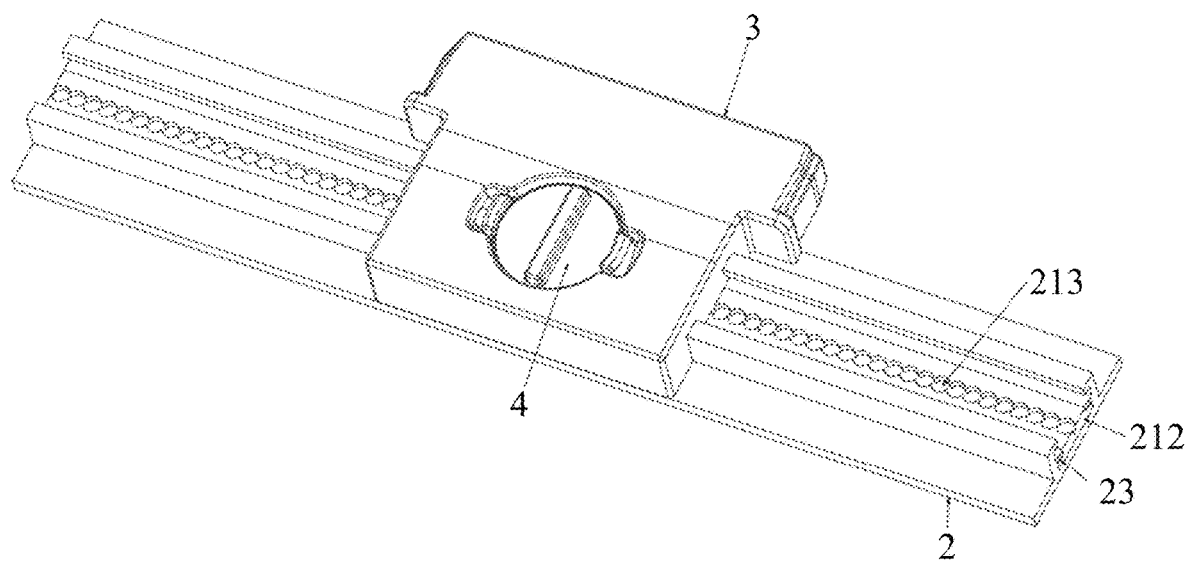
FIG. 20 is a schematic diagram illustrating a three-dimensional structure of a chute plug, a movable switch, and a cross beam according to Example 5 of the present disclosure.
Figure 21:
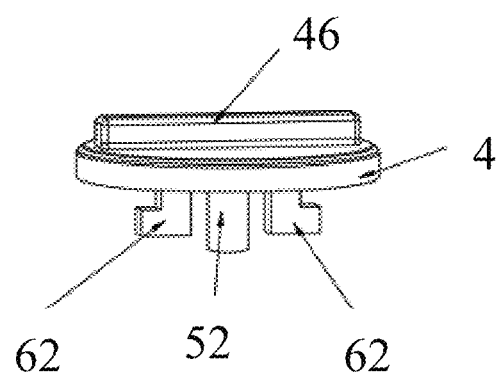
FIG. 21 is a schematic diagram illustrating a disassembled structure of a chute plug, a movable switch, and a cross beam according to embodiment 5 of the present disclosure.
Figure 21:
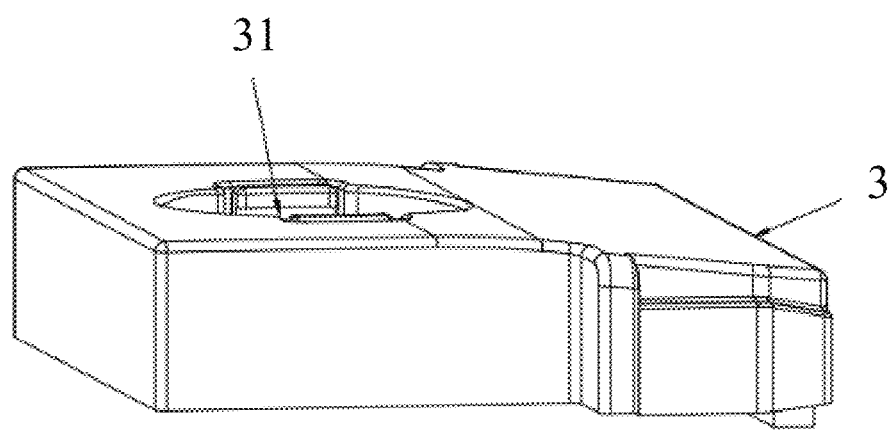
Figure 21:
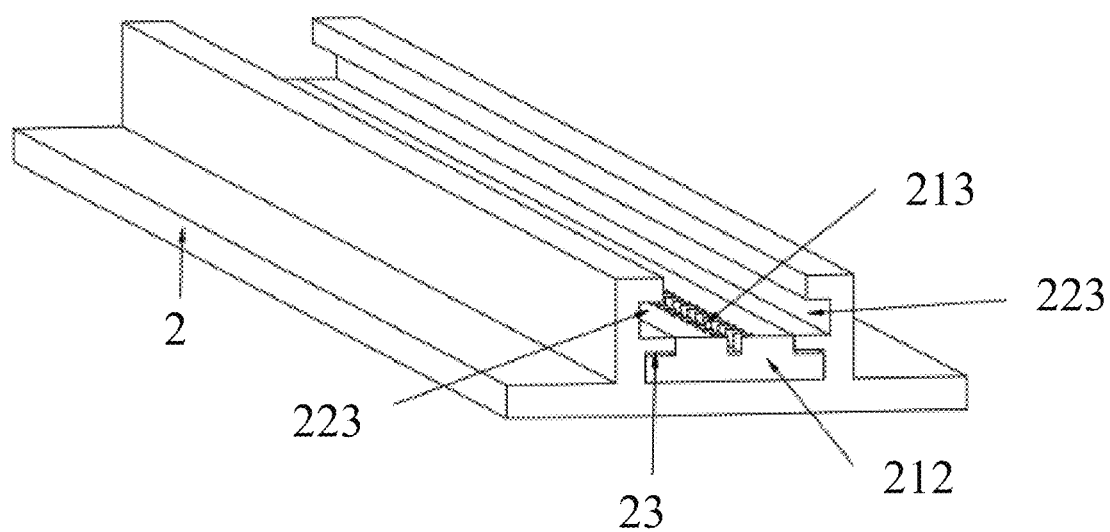
Figure 22:
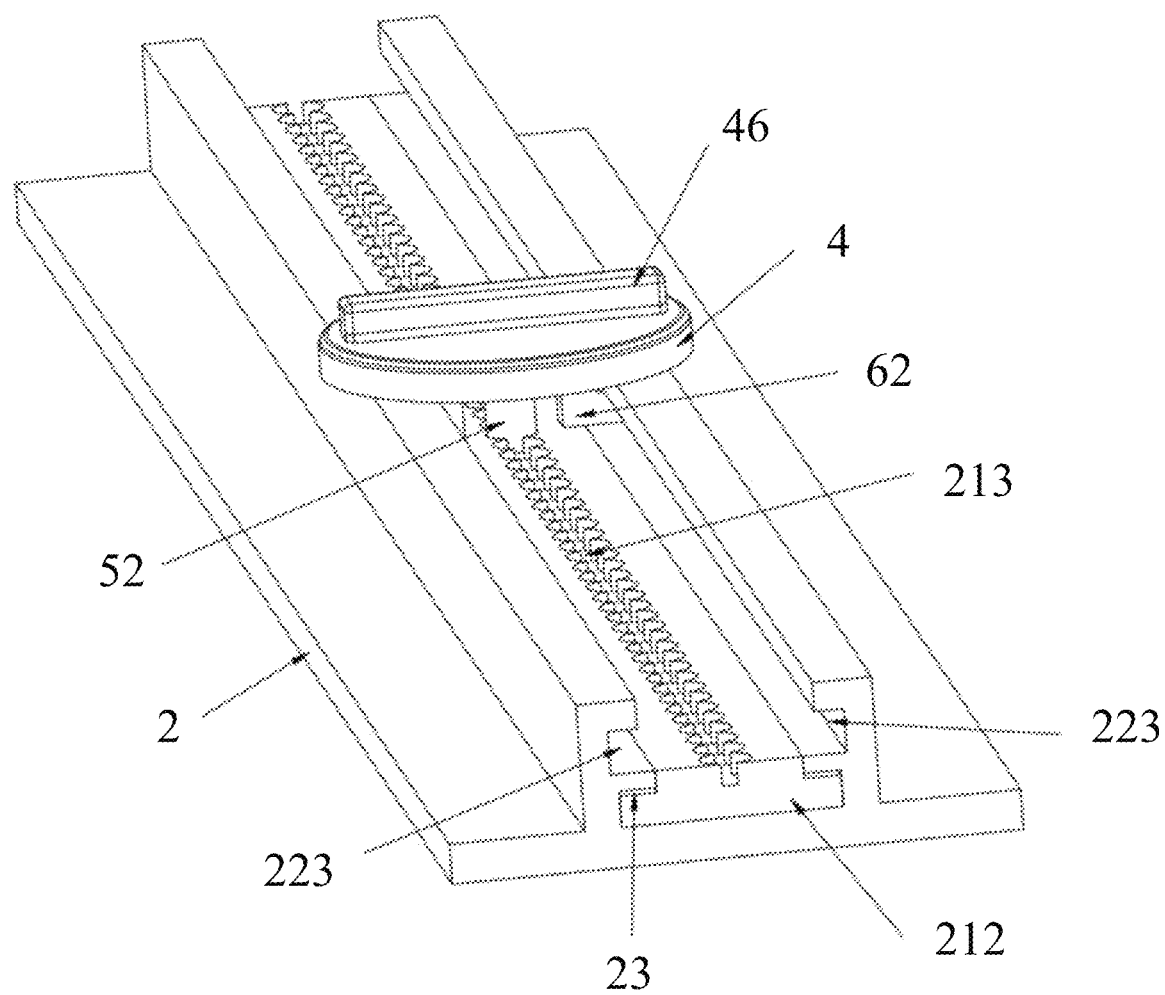
FIG. 22 is a schematic diagram illustrating a three-dimensional structure of a movable switch and a cross beam according to embodiment 5 of the present disclosure.

FIG. 20 is a schematic diagram illustrating a three-dimensional structure of a chute plug, a movable switch, and a cross beam according to Example 5 of the present disclosure. FIG. 21 is a schematic diagram illustrating a disassembled structure of a chute plug, a movable switch, and a cross beam according to embodiment 5 of the present disclosure. FIG. 22 is a schematic diagram illustrating a three-dimensional structure of a movable switch and a cross beam according to embodiment 5 of the present disclosure.

Referring to FIG. 20 to FIG. 22, according to some embodiments of the present disclosure, the present embodiment provides a rotary movable switch. Specifically, a chute plug 3 is slidably mounted on a cross beam 2. The chute plug 3 is provided with a receiving groove 31, and a movable switch 4 is provided in the receiving groove 31. The bottom surface of the movable switch 4 is fixedly provided with a circular rod 52 and two L-shaped members 62, the two L-shaped members 62 are provided on two sides of the circular rod 52, with the circular rod 52 serving as a first mating member and the two L-shaped members 62 serving as a second mating member.

The circular rod 52 refers to a cylindrical rod-like structure fixed to the bottom surface of the movable switch 4. The L-shaped members 62 refer to L-shaped structures fixed to the bottom surface of the movable switch 4.

In this embodiment, the cross beam 2 is provided with a retaining groove 23, which is fixedly provided with a long strip 212, and the long strip 212 is provided with a plurality of circular holes 213, with the circular holes 213 serving as a first limiting member, and the circular rod 52 plug-fitting with the circular holes 213. The second limiting member 22 includes two limiting slots 223 provided on two sides of the long strip 212, the second mating member 6 includes two L-shaped members 62 provided on two sides of the circular rod 52, and horizontal segments of the two L-shaped members 62 are respectively interlocked and connected with the two limiting slots 223. The circular rod 52 and the L-shaped members 62 are both fixedly provided on the bottom surface of the movable switch 4, so that the movable switch 4 drives the circular rod 52 and the L-shaped members 62 to rotate when the movable switch 4 is rotated.

The long strip 212 refers to a strip structure provided within the retaining groove 23. The circular holes 213 refer to circular holes located in the long strip 212. The limiting slots 223 refer to slot-like structures provided on the two sides of the long strip 212.

Understandably, the circular rod 52 plug-fits with the circular holes 213, which makes the chute plug 3 and the chute 1 fixed between two cross beams 2 in a transverse direction. The horizontal segments of the two L-shaped members 62 are respectively interlocked and connected with the two limiting slots 223, which make the chute plug 3 and the chute 1 fixed between the two cross beams 2 in a longitudinal direction.

Different from the above-mentioned embodiments 1 to 4, the first mating member 5 is engaged with the first limiting member 21 in embodiments 1 to 4, whereas the first mating member 5 plug-fits with the first limiting member 21 in the present embodiment. When the movable switch 4 rotates to drive the circular rod 52 and the L-shaped members 62 to rotate, the interlocked connection between the horizontal segments of the L-shaped members 62 on the bottom surface of the movable switch 4 and the limiting slot 223 on the cross beam 2 may be changed.

The circular rod 52 is inserted into the circular holes 213 on the cross beam 2, and the movable switch 4 is rotated so that the horizontal segments of the L-shaped members 62 enter the limiting slot 223. At this time, the circular rod 52 cannot be pulled out of the circular holes 213, and the chute plug 3 together with the chute 1 is completely fixed and cannot be moved in the horizontal and vertical directions, achieving stabilization and firmness, so that the chute plug 3 cannot be separated from the cross beams 2 to be picked separately.

By rotating the movable switch 4 to cause the horizontal segments of the L-shaped members 62 to leave the limiting slot 223, at this time, the circular rod 52 can be pulled out of the circular hole 213, and the chute plug 3 together with the chute may be moved along the transverse direction of the cross beam 2, realizing the adjustment of the spacing between chutes 1, and the chute plug 3 may be taken up separately from the cross beam 2. After adjusting the spacing between chutes 1 to be appropriate, the chute 1 is fully fixed on the two cross beams 2 by rotating the movable switch 4.

In this embodiment, the movable switch 4 is provided with a toggle protrusion 46 for lending force, facilitating the user to rotate the movable switch 4.

Embodiment 6

Figure 23:
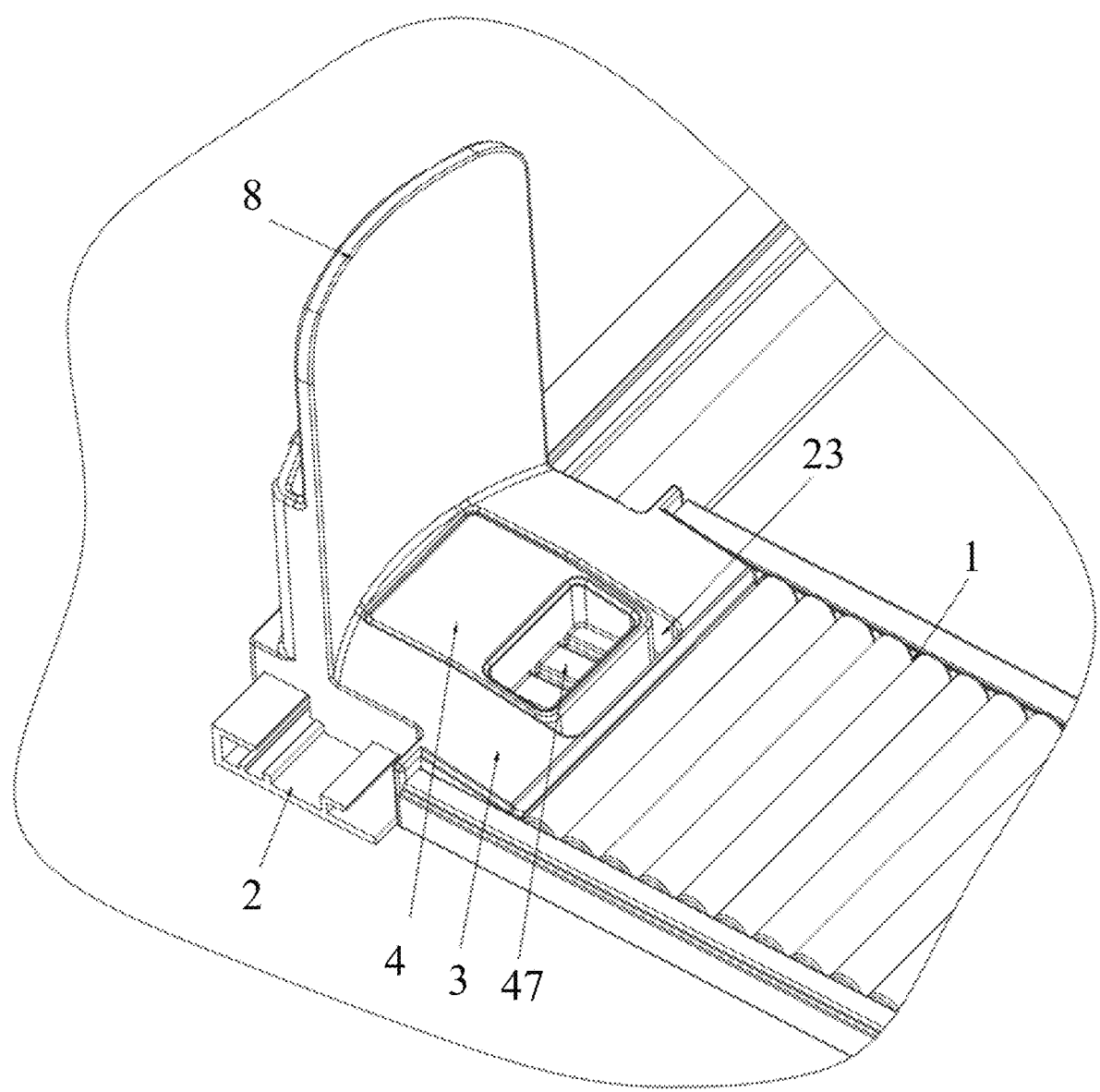
FIG. 23 is a schematic diagram illustrating a three-dimensional structure according to embodiment 6 of the present disclosure.

FIG. 23 is a schematic diagram illustrating a three-dimensional structure according to embodiment 6 of the present disclosure.

Referring to FIG. 23, a receiving groove 31 of the present embodiment is provided at the back of a baffle plate 8, and a movable switch 4 is located in the receiving groove 31, which may utilize the baffle plate 8 to cover the movable switch 4, avoiding the movable switch 4 being in a position facing the user, thus preventing the movable switch 4 from being mistakenly touched, effectively safeguarding the stability of a chute 1. In other embodiments, the receiving groove 31 is provided in front of the baffle plate 8, and the movable switch 4 is located in the receiving groove 31, facilitating the user to operate the movable switch 4.

In this embodiment, the top surface of the movable switch 4 is provided with a groove 47, allowing the user to push the movable switch 4 through the groove 47, making it more convenient to use.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and amendments are intended to be suggested by this disclosure and are within the spirit and scope of the exemplary embodiments of the present disclosure.

What is claimed is:

1. An adjustable chute structure, comprising at least one chute and two cross beams disposed at two ends of the chute, each of the two ends of the chute being connected with a chute plug, the chute plug being slidably mounted on the two cross beams, wherein
   the chute plug is provided with a receiving groove, the receiving groove is provided with a movable switch, and a first mating member and a second mating member coupled with the movable switch;
   the two cross beams are provided with a plurality of first limiting members arranged consecutively in a lengthwise direction, and the chute engages or plug-fits with the first limiting member through the first mating member, to fix the chute between the two cross beams in a transverse direction; and
   each of the two cross beams is provided with a second limiting member, and the chute is interlocked and connected with the second limiting member through the second mating member, to fix the chute to the two cross beams in a longitudinal direction.

2. The adjustable chute structure of claim 1, wherein the first limiting member is a rack secured to the two cross beams, the rack is provided with consecutive first catches, the first mating member is a catch tooth, and the first catches engage with the catch tooth.

3. The adjustable chute structure of claim 2, wherein the second limiting member is a slot provided on a top surface of each of the two cross beams, the second mating member is a catch member, and the catch member is interlocked with the slot.

4. The adjustable chute structure of claim 3, wherein the catch tooth and the catch member are both fixedly provided on a bottom surface of the movable switch to cause the movable switch to move the catch tooth and the catch member.

5. The adjustable chute structure of claim 3, further comprising a connecting member configured to connect the catch tooth and the catch member, wherein the connecting member is disposed below the movable switch, the connecting member is provided with a sloping groove, a bottom surface of the movable switch is provided with a limiting protrusion adapted to the sloping groove, the limiting protrusion is provided in the sloping groove to enable the movable switch to control movement of the connecting member to drive the catch tooth and the catch member to move.

6. The adjustable chute structure of claim 4 or 5, wherein a bottom surface of the movable switch is provided with a plurality of snaps, the receiving groove is provided with a plurality of snap slots, and the plurality of snaps are snap-fit mounted in the plurality of snap slots to enable the movable switch to be slidably provided in the receiving groove.

7. The adjustable chute structure of claim 4, wherein a side of the movable switch is provided with a horizontal swivel, and two ends of the horizontal swivel are hinged in the receiving groove to enable the movable switch to rotate about the horizontal swivel as an axis.

8. A non-transitory computer-readable storage medium storing computer instructions, wherein when a computer reads the computer instructions in the storage medium, the computer performs the method of claim 1.

9. The adjustable chute structure of claim 8, wherein a spring is provided in the receiving groove, a stopper is provided on the top surface of the movable switch, and two ends of the spring rest against the stopper and the limiting block, respectively; or
   a spring is provided in the sliding groove, with two ends of the spring rest against the limiting block and a groove wall of the sliding groove, respectively.

10. The adjustable chute structure of claim 1, wherein the two cross beams are fixedly provided with a long strip, the first limiting member is a plurality of circular holes set in the long strip, the first mating member is a circular rod, and the circular rod is inserted and coordinated with the plurality of circular holes;
   the second limiting member is two limiting slots provided on two sides of the long strip, the second mating member is two L-shaped members provided on two sides of the circular rod, and horizontal segments of the two L-shaped members are respectively interlocked and connected with the two limiting slots; and
   the circular rod and the two L-shaped members are fixedly provided on the bottom surface of the movable switch, and the circular rod and the two L-shaped members are driven to rotate when the movable switch rotates.

* * * * *